(12) United States Patent
Bunker, V et al.

(10) Patent No.: US 7,325,252 B2
(45) Date of Patent: Jan. 29, 2008

(54) NETWORK SECURITY TESTING

(75) Inventors: Nelson Waldo Bunker, V, Dallas, TX (US); David Laizerovich, Dallas, TX (US); Eva Elizabeth Bunker, Dallas, TX (US); Joey Don Van Schuyver, Dallas, TX (US)

(73) Assignee: Achilles Guard Inc., Dallas, TX (US)

( * ) Notice: Subject to any disclaimer, the term of this patent is extended or adjusted under 35 U.S.C. 154(b) by 1058 days.

(21) Appl. No.: 10/043,654

(22) Filed: Jan. 10, 2002

(65) Prior Publication Data

US 2003/0009696 A1    Jan. 9, 2003

Related U.S. Application Data

(63) Continuation-in-part of application No. 09/861,001, filed on May 18, 2001.

(51) Int. Cl.
G06F 21/00    (2006.01)
(52) U.S. Cl. .............................. 726/25; 726/23; 726/24
(58) Field of Classification Search ................ 713/200, 713/201; 726/23, 24, 25
See application file for complete search history.

(56) References Cited

U.S. PATENT DOCUMENTS

| | | | |
|---|---|---|---|
| 5,850,386 A | 12/1998 | Anderson et al. | |
| 5,892,903 A | 4/1999 | Klaus | |
| 6,006,016 A | 12/1999 | Faigon et al. | |
| 6,088,804 A * | 7/2000 | Hill et al. | 726/25 |
| 6,185,689 B1 | 2/2001 | Todd, Sr. et al. | |
| 6,226,372 B1 * | 5/2001 | Beebe et al. | 379/189 |
| 6,253,337 B1 * | 6/2001 | Maloney et al. | 714/38 |
| 6,269,330 B1 * | 7/2001 | Cidon et al. | 714/43 |
| 6,279,113 B1 * | 8/2001 | Vaidya | 726/23 |
| 6,292,822 B1 * | 9/2001 | Hardwick | 718/105 |
| 6,298,445 B1 * | 10/2001 | Shostack et al. | 726/25 |
| 6,301,668 B1 * | 10/2001 | Gleichauf et al. | 713/201 |

(Continued)

OTHER PUBLICATIONS

Srinivasan, "Binding Protocols for the ONC RPC Version 2," Network Working Group RFC 1833, Aug. 1995, pp. 1-3.*

(Continued)

Primary Examiner—Kambiz Zand
Assistant Examiner—Tongoc Tran
(74) Attorney, Agent, or Firm—Howison & Arnott, L.L.P.

(57) ABSTRACT

To answer the security needs of the market, a preferred embodiment was developed. A preferred embodiment provides real-time network security vulnerability assessment tests, possibly complete with recommended security solutions. External vulnerability assessment tests can emulate hacker methodology in a safe way and enable study of a network for security openings, thereby gaining a true view of risk level without affecting customer operations. Because this assessment can be performed over the Internet, both domestic and worldwide corporations benefit. A preferred embodiment's physical subsystems combine to form a scalable holistic system that can be able to conduct tests for thousands of customers any place in the world. The security skills of experts can be embedded into a preferred embodiment systems and automated the test process to enable the security vulnerability test to be conducted on a continuous basis for multiple customers at the same time. A preferred embodiment can reduce the work time required for security practices of companies from three weeks to less than a day, as well as significantly increase their capacity. Component subsystems typically include a Database, Command Engine, Gateway, multiple Testers, Report Generator, and an RMCT.

34 Claims, 23 Drawing Sheets

U.S. PATENT DOCUMENTS

| | | | |
|---|---|---|---|
| 6,324,656 B1* | 11/2001 | Gleichauf et al. | 714/37 |
| 6,484,315 B1* | 11/2002 | Ziese | 717/173 |
| 6,574,737 B1* | 6/2003 | Kingsford et al. | 726/25 |
| 6,766,458 B1* | 7/2004 | Harris et al. | 726/6 |
| 6,782,527 B1* | 8/2004 | Kouznetsov et al. | 717/103 |
| 2001/0034847 A1* | 10/2001 | Gaul, Jr. | 713/201 |
| 2002/0026591 A1* | 2/2002 | Hartley et al. | 713/201 |

OTHER PUBLICATIONS

Ptacek et al., "Insertion, Evasion, and Denial of Service: Eluding Network Intrusion Detection", http://www.insecure.org/stf/secnet_ids/secnet_ids.html., Secure Network Inc., Jan. 1998.*

Li et al., Proceedings of 2000 Internal Parallel and Distributed Processing Symposium (IPDPS'00), May 2000, pp. 431-438. http://www.cs.wm.edu/hpcs/WWW/HTML/publications/abs00-2.html.*

Zhang et al., "Modeling and characterizing Parallel Computing Performance on Heterogeneous Networks of Workstations", Proceedings of 7th IEEE Symposium on Parallel and Distributed Processing (SPDP'95), Oct. 1995.*

Mache, "Parallel I/O and Communication -Sensitive Scheduling on High Performance Parallel Computers", Ph.D. thesis., Jan. 6, 1999. http:/www.lclark.edu/~jmache/diss.html.* http://web.archive.org/web/19990117014320/http://java.sun.com/products/jdbc/overview.html, 1999.*

Falsafi et al., "Cost/Performance of a Parallel Computer Simulator", Computer Science Department, University of Wisconsin Madison, pp. 173-182, 1994, Workshop on Parallel Computer Simulator.*

Polk, "Automated Tools for Testing Computer Systems Vulnerability", http://www.nsi.org/Library/Compsec/CSECTOOL.TXT, 1993.*

Gillmor, S., "Qualys is Proactive about Network Security," InfoWorld Daily News, Sep. 10, 2002 [online], [retrieved on Sep. 11, 2002]. Retrieved from Lexis Nexis (TM). Accession No. 711:0:64193595.

Internet Scanner, User Guide, Version 6.1; Jan. 2001; 177 pages.

Internet Security Systems, System Scanner; 2 pages, 2004.

Internet Security Systems, "Network and Host-based Vulnerability Assessment"; www.archive.org/web/20010207011324; Feb. 7, 2001; 10 pages.

FOLDOC, Free On-Line Dictionary of Computing; Application Program Interface; http://foldoc.linuxguruz.org; Dec. 8, 2004; 2 pages.

Gula, Ron, "Dedicated and Distributed Vulnerability Management"; Tenable Network Security; www.tenablesecurity.com; Dec. 2002 (updated Jun. 2003); 10 pages.

Humphries, Jeffrey W., "Secure Mobile Agents for Network Vulnerability Scanning"; 2000 IEEE; pp. 19-25.

The Nessus Project; Demonstration: The First Step; web.archive.org/web/20001217161000; Dec. 8, 2004; 45 pages.

Polk, W. Timothy; "Automated Tools for Testing Computer Systems Vulnerability"; nsi.org/Library/Compsec/CSECTOOL.TXT; Dec. 2, 2004; 24 pages.

Rezabek, John, "The Anatomy of a Web Attack"; Internet Security Systems; web.archive.org/web20010202212700; 28 pages, 2001.

SANS Institute 2002, "Distributed scan model for Enterprise-Wide Network Vulnerability Assessment"; As part of the Information Security Reading Room; 8 pages, 2002.

Barnett, "NOOSE-Networked Object-Oriented Security Examiner"; 2000 LISA XIV, Dec. 3-8, 2000, New Orleans, LA; pp. 369-378.

Business Wire; SecureLogix Makes Complete Network Security a Reality, www.businesswire.com/webbox/bw.080999/192210202. htm; Dec. 2, 2004; 2 pages.

SATAN Reference (Security Administrator Tool for Analyzing Networks); web.archive.org/web/20010218052520; Dec. 6, 2004; 27 pages.

SATAN Control Panel (Security Administrator Tool for Analyzing Networks); www.fish.com/satan/demo; Dec. 6, 2004; 7 pages.

Source Force: Rnmap home; web.archive.org/web/20010201055400; Dec. 8, 2004; 2 pages.

Stewart, Andrew J., "Distributed Metastasis: A Computer Network Penetration Methodology"; www.packetfactory.net; Aug. 12, 1999; 11 pages.

Shuja, Faiz Ahmad, "Distributed Vulnerability Assessment with Nessus"; GSEC Practical Assignment; SANS Institute 2004; Oct. 2003; 25 pages.

WINS Server; web.archive.org/web/19991013120451; Dec. 8, 2004; 3 pages.

Sygate Technologies Portscan FAQ; web.archive.org/web/20010204065400; Dec. 6, 2004; 3 pages.

Norton AntiVirus Corporate Edition, Implementation Guide; Documentation version 7.5; 40 pages, 1999.

* cited by examiner

NETWORK SECURITY TESTING

CROSS-REFERENCE TO RELATED APPLICATIONS

This application claims the benefit of and is a continuation-in-part of the following U.S. Nonprovisional Application:

| PARENT U.S. NONPROVISIONAL PATENT APPLICATION | | |
| --- | --- | --- |
| Ser. No. | Title | Filing Date |
| 09/861,001 | Network Vulnerability Assessment System and Method | May 18, 2001 |

The benefit of 35 U.S.C. § 120 is claimed for the above referenced commonly owned application. The contents of the application referenced in the table above is not necessarily identical to the contents of this application.

TECHNICAL FIELD

The present application relates to a system and method for assessing vulnerability of networks or systems to cyber attack.

DESCRIPTION OF THE RELATED ART

As the Internet emerges as an increasingly important medium for conducting commerce, corporate businesses can be being introduced to new levels of opportunity, prosperity . . . and risk. To take full advantage of the opportunities that electronic commerce has to offer, corporations will be increasingly relying on the Internet, Intranets and Extranets to maximize their capabilities. The Internet has become a driving force creating new opportunities for growth through new products and services, enabling greater speed to penetrate global markets, and increasing productivity to facilitate competition. However, embracing the Internet also means undergoing a fundamental shift from an environment where systems and networks have been closed and protected to an environment that can be open, accessible and by its very nature, at risk. The Internet is assumed to be unsecured; the people using the Internet are assumed to be untrustworthy.

The risks come from 30,000 hacker sites that teach any site visitors how to penetrate systems and freely share tools and expertise with anyone who is interested. The tools that are freely available on these sites can be software-packaged electronic attacks that take only minutes to download and require no special knowledge to use, but give the user the ability to attack networks and computers anywhere in the world. In fact, International Data Corporation has estimated that more than 100 million people have the skills to conduct cyber-attacks. Security experts realize that almost every individual online can be now a potential attacker. Currently, people using the tools tend to be individuals, corporations and governments that are using the information provided to steal corporate assets and information, to damage systems or to plant software inside systems or networks.

In addition to the growth of the number of people who can break in, there can be an ongoing explosion in the number of ways to break in. In the year 2000, 1090 new security vulnerabilities were discovered by hackers and security experts and posted on the Internet for anyone to use. Every vulnerability can be a potential way to bypass the security of a particular type of system. Vulnerabilities were discovered for a broad range of systems; and the more popular a system or computer, the more vulnerabilities were found. For example, installing some Microsoft products will actually install many features and functionalities that are not necessarily intended by the computer user, such as a web server, an e-mail server, indexing services, etc. A default install of Microsoft ISS4 would contain over 230 different vulnerabilities.

The pace of discovery in 2000, at an average of more than two new vulnerabilities per day, led to 100% growth in the number of new vulnerabilities from 1999. And well over 2000 new vulnerabilities were discovered in 2001, continuing an extraordinary rate of vulnerability growth. These factors have driven computer break-ins to become a daily news story and have created corporate losses in the hundreds of millions of dollars.

From a testing perspective, vulnerabilities can only be found in devices that are known to exist. Therefore, the ability to see all of the networks and systems that are reachable from the Internet is paramount to accurate security testing.

In response to the increased need for security, corporations have installed Intrusion Detection Systems (IDS) and Firewalls to protect their systems. These security devices attempt to prevent access by potential intruders. A side effect of these devices can be to also block vulnerability assessment software scanners, making them unreliable to the corporations who can be most concerned about security.

Blocking by security devices affects software scanners and all vulnerability assessments that come from a single location in two ways. First, all computers cannot be identified by the scanner. As only computers that are found can be analyzed for vulnerabilities, not all of the access points of the network can be checked for security holes. Secondly, the security device can block access in mid-process of analyzing a computer for vulnerabilities. This can result in only partial discovery of security holes. An administrator can correct all the reported vulnerabilities and believe that the computer is secure, when there remain additional problems that were unreported. Both of these scenarios result in misleading information that can actually increase the risk of corporations.

It is apparent that network vulnerability issues are of strategic importance to businesses and other entities connected to the Internet. The state of the art of network vulnerability testing and reporting test results successfully addresses many issues, but leaves other issues unresolved such as the creation of useful and accessible reporting formats, for example. There are many other unresolved issues, some of which will be explicitly mentioned herein and many of which will be apparent to one of ordinary skill in the art upon review of this application. The present invention successfully addresses those unresolved issues as described, as well as many more that will be apparent to one of ordinary skill in the art.

SUMMARY OF THE INVENTION

To answer the security needs of the market, a preferred embodiment was developed. A preferred embodiment provides real-time network security vulnerability assessment tests, possibly complete with recommended security solutions. External vulnerability assessment tests can emulate hacker methodology in a safe way and enable study of a network for security openings, thereby gaining a true view of risk level without affecting customer operations. This assessment can be performed over the Internet for domestic and worldwide corporations.

A preferred embodiment's physical subsystems combine to form a scalable holistic system that is able to conduct tests for thousands of customers any place in the world. The security skills of experts can be embedded into a preferred embodiment systems and incorporated into the test process to enable the security vulnerability test to be conducted on a continuous basis for multiple customers at the same time. A preferred embodiment can reduce the work time required for security practices of companies from three weeks to less than a day, as well as significantly increase their capacity. This can expand the market for network security testing by allowing small and mid-size companies to be able to afford proactive, continuous electronic risk management.

A preferred embodiment includes a Test Center and one or more Testers. The functionality of the Test Center can be divided into several subsystem components, possibly including a Database, a Command Engine, a Gateway, a Report Generator, an Early Warning Generator, and a Repository Master Copy Tester.

The Database warehouses raw information gathered from the customers systems and networks. The raw information can be refined for the Report Generator to produce different security reports for the customers. Periodically, for example, monthly, information can be collected on the customers for risk management and trending analyses. The reports can be provided in hard copy, encrypted email, or HTML on a CD. The Database interfaces with the Command Engine, the Report Generator and the Early Warning Generator subsystems. Additional functions of the Database and other preferred embodiment subsystem modules can be described in more detail subsequently, herein.

The Command Engine can orchestrate hundreds of thousands of "basic tests" into a security vulnerability attack simulation and iteratively test the customer systems based on information collected. Every basic test can be an autonomous entity that is responsible for only one piece of the entire test conducted by multiple Testers in possibly multiple waves and orchestrated by the Command Engine. Mimicking hacker and security expert thought processes, the attack simulation can be modified automatically based on security obstacles discovered and the type of information collected from the customer's system and networks. Modifications to the testing occur real-time during the test and adjustments can be made to basic tests in response to the new information about the environment. In addition to using the collected data to modify the attack/test strategy, the Command Engine stores the raw test results in the Database for future use. The Command Engine interfaces with the Database and the Gateway.

The Gateway is the "traffic director" that passes test instructions from the Command Engine to the Testers. The Gateway receives from the Command Engine detailed instructions about the different basic tests that need to be conducted at any given time, and it passes the instructions to one or more Testers, in possibly different geographical locations, to be executed. The Gateway can be a single and limited point of interface from the Internet to the Test Center, with a straightforward design that enables it to secure the Test Center from the rest of the Internet. All information collected from the Testers by the Gateway can be passed to the Command Engine.

The Testers can reside on the Internet, in a Web-hosted environment, and can be distributed geographically anyplace in the world. The entire test can be split up into tiny pieces, and it can also originate basic tests from multiple points and therefore be harder to detect and more realistic. The Testers house the arsenals of tools that can be used to conduct hundreds of thousands of hacker and security tests. The Tester can receive from the Gateway, via the Internet, basic test instructions that can be encrypted. The instructions inform the Tester which test to run, how to run it, what to collect from the customer system, etc. Every basic test can be an autonomous entity that can be responsible for only one piece of the entire test that can be conducted by multiple Testers in multiple waves from multiple locations. Each Tester can have many basic tests in operation simultaneously. The information collected by each test about the customer systems is sent to the Gateway and from there to the Database to contribute to creation of a customer's system network configuration.

The Report Generator can use the detailed information collected about a customer's systems to generate reports about the customer's system profile, Internet Address Utilization, publicly offered (i.e., open) services (e.g., web, mail, ftp, etc.), version information of installed services and operating systems, detailed security vulnerabilities, Network Topology Mapping, inventory of Firewall/Filtering Rule sets, publicly available company information such as usernames, email addresses, computer names, etc. The types of reports can be varied to reflect the particular security services purchased by the customer. The report can be created based on the type of information the customer orders and can be delivered by the appropriate method and at the frequency requested.

New vulnerabilities can be announced on a daily basis. So many, in fact, it can be very difficult for the typical network administrator to keep abreast of relevant security news. Bugtraq, a popular mailing list for announcements, has often received over 350 messages a day. Thus, a network administrator using that resource, for example, may need to review a tremendous number of such messages in order to uncover two or three pertinent warnings relevant to his network. Then each machine on his network can need to be investigated in order to determine which can be affected or threatened. After the fix or patch can be installed, each machine can need to be re-examined in order to insure that the vulnerability can be truly fixed. This process can need to be repeated for each mailing list or resource similar to Bugtraq that the administrator can subscribe to.

When a new security vulnerability is announced on a resource like Bugtraq, the information can be added to the Vulnerability Library. Each vulnerability can be known to affect specific types of systems or specific versions of applications. The Vulnerability Library enables each vulnerability to be classified and cataloged. Entries in the Vulnerability Library might include, for example, vulnerability designation, vendor, product, version of product, protocol, vulnerable port, etc. Classification includes designating the severity of the vulnerability, while cataloging includes relating the vulnerability to the affected system(s) and/or application(s). The configuration of the new vulnerability can be compared to the customer's system network configuration compiled in the last test for the customer. If the new vulnerability is found to affect the customer systems or networks then a possibly detailed alert can be sent to the customer. The alert indicates which new vulnerability threatens the customer's network, possibly indicating specifically which machines can be affected and what to do in order to correct the problem. Then, depending on the customer profile, after corrective measures are taken, the administrator can immediately use the system to verify the corrective measures in place or effectiveness of the corrective measures can be verified with the next scheduled security assessment.

Only customers affected by the new security vulnerabilities can receive the alerts. The Early Warning Generator system filters the overload of information to provide accurate, relevant information to network administrators. Additionally, the known configuration of the customer can be updated every time a security vulnerability assessment can be performed, making it more likely that the alerts remain as accurate and relevant as possible.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of illustrative sample embodiments when read in conjunction with the accompanying drawings, wherein:

DETAILED DESCRIPTION OF THE PREFERRED EMBODIMENTS

Figure 1:
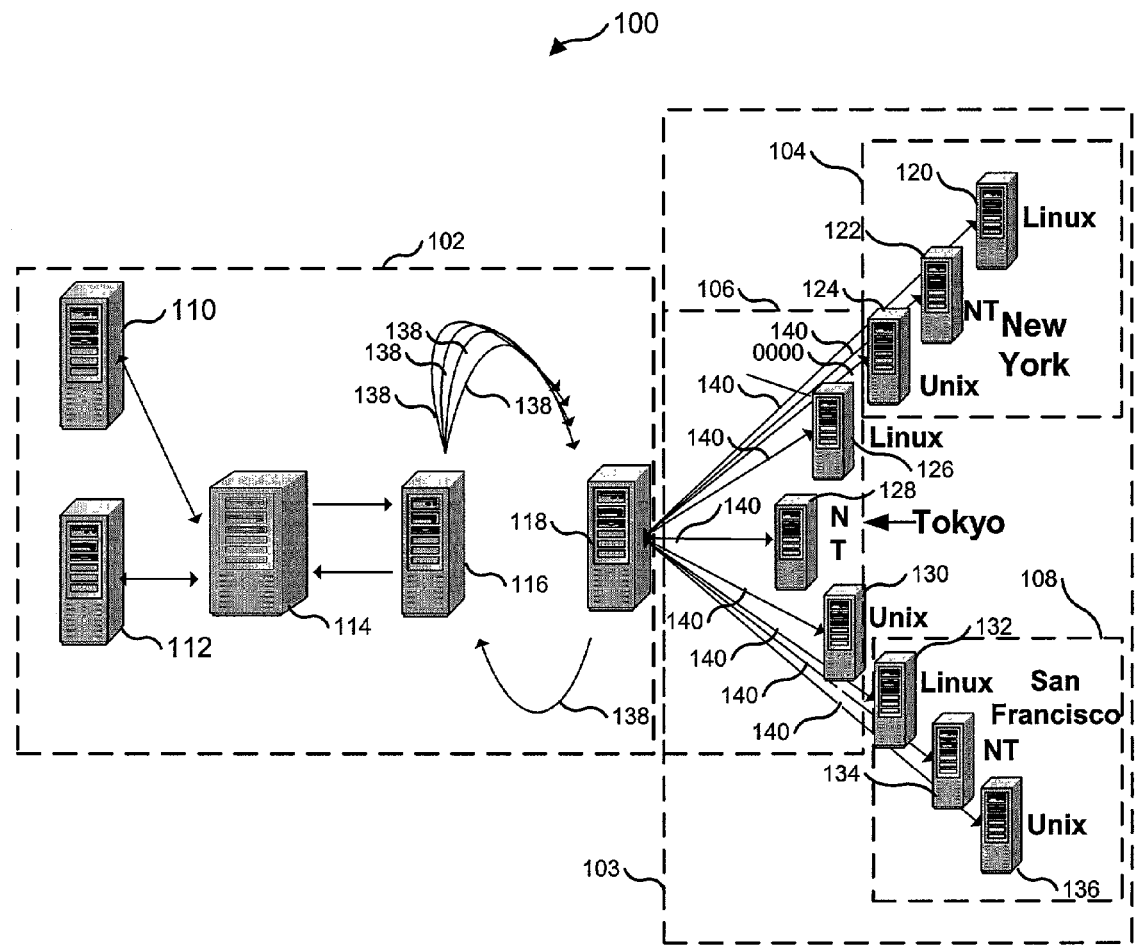
FIG. 1 depicts a diagram of an overview of a network vulnerability assessment system, in accordance with a preferred embodiment of the present invention.
Figure 2:
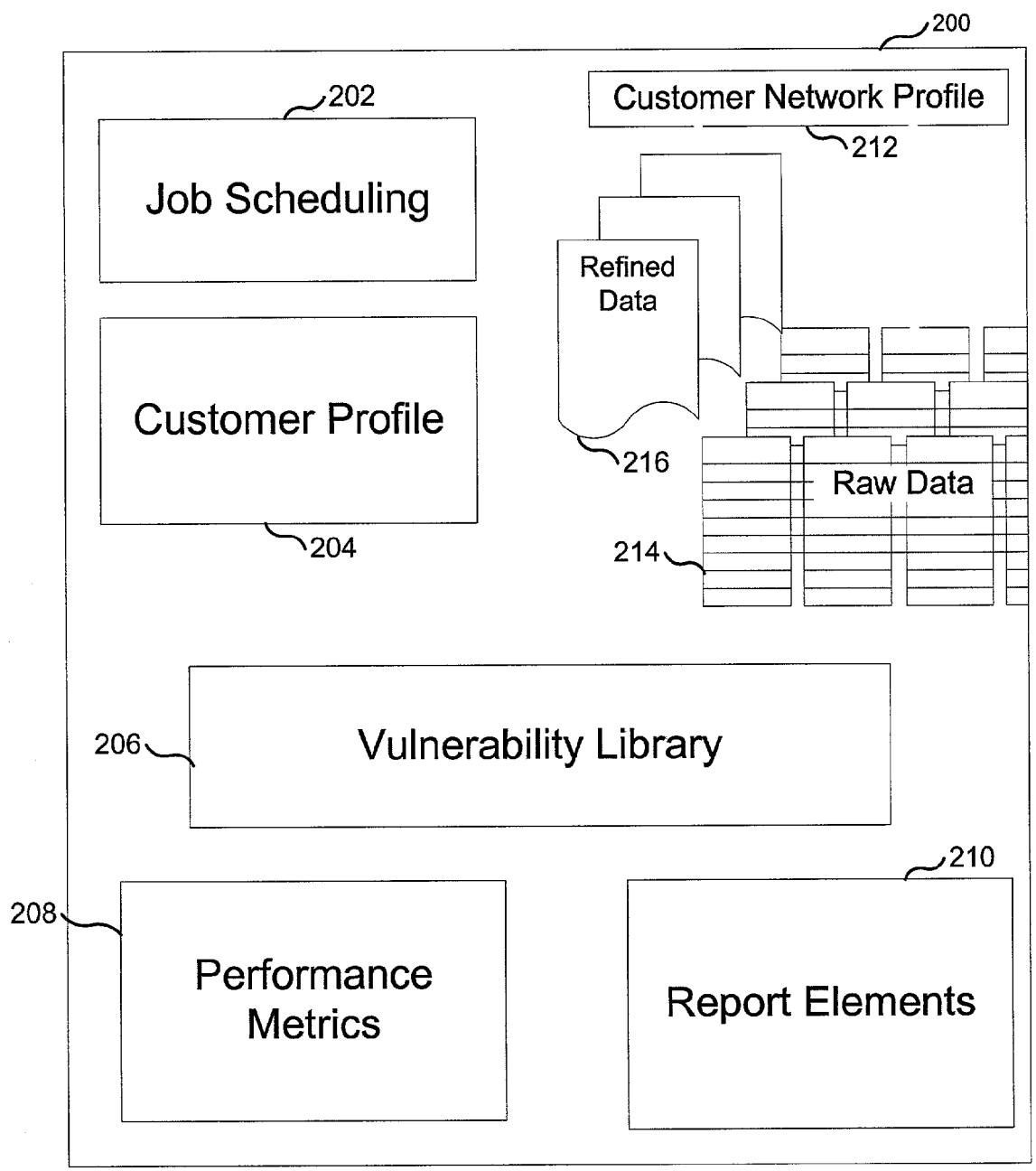
FIG. 2 shows a block diagram of a Database logical structure, in accordance with a preferred embodiment of the present invention.
Figure 3:
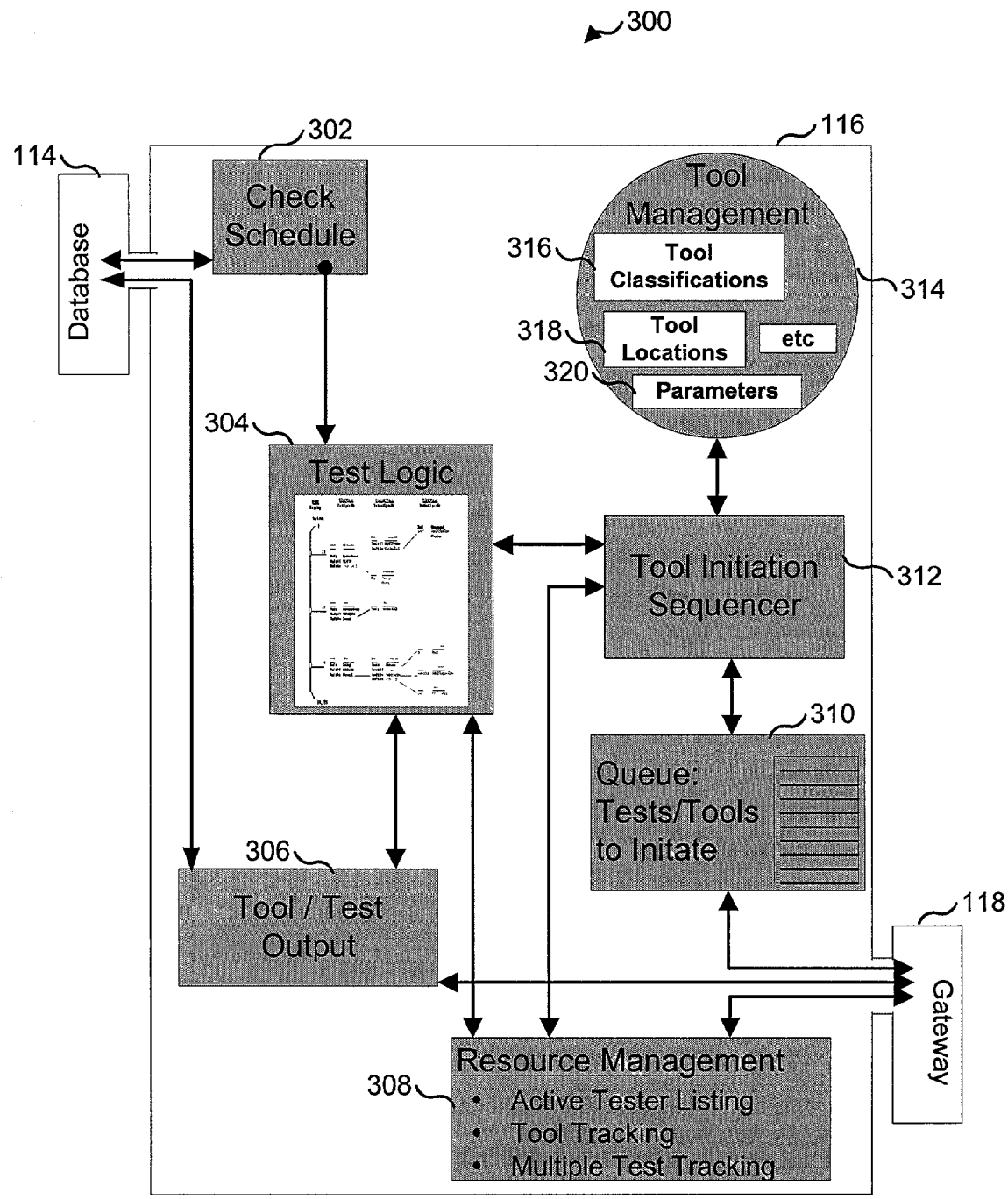
FIG. 3 depicts a block diagram of a Command Engine, in accordance with a preferred embodiment of the present invention.

The numerous innovative teachings of the present application will be described with particular reference to the presently preferred embodiment (by way of example, and not of limitation). Referring now to the drawings, wherein like reference numbers are used to designate like elements throughout the various views, several embodiments of the present invention are further described. The figures are not necessarily drawn to scale, and in some instances the drawings have been exaggerated or simplified for illustrative purposes only. One of ordinary skill in the art will appreciate the many possible applications and variations of the present invention based on the following examples of possible embodiments of the present invention.

Database Subsystem Functionality

The Database 114 has multiple software modules and storage facilities 200 for performing different functions. The Database warehouses the raw data 214 collected by the Testers' 502 tests 516 from customers systems and networks 1002 and that data can be used by the Report Generator 112 to produce different security reports 2230 for the customers. The raw data 214 contained in the Database 114 can be migrated to any data format desired, for example, by using ODBC to migrate to Oracle or Sybase. The type of data might include, for example, IP addresses, components, functions, etc. The raw data 214 can typically be fragmented and cannot be easily understood until decoded by the Report Generator 110.

The brand of database 114 is unimportant and the entire schema was designed to port to any database. A preferred embodiment uses Microsoft SQL server, because of availability of the software and experience in developing in SQL Server. Logical overview 200 shows a logical view of Database 114.

Job Scheduling

The job scheduling module 202 can initiate customer jobs at any time. It uses the customer profile 204 information to tell the Command Engine 116 what services the customer should receive, for example, due to having been purchased, so that the Command Engine 116 can conduct the appropriate range of tests 516.

Customer Profile

Every customer has a customer profile 204 that can include description of the services the customer will be provided, the range of IP addresses the customer's network 1002 spans, who should receive the monthly reports, company mailing address, etc. The customer profile 204 can be used by the Command Engine 114 to conduct an appropriate set of tests 516 on the customer's systems 1002. The customer profile 204 can be also used by the Report Generator 110 to generate appropriate reports 2230 and send them to the appropriate destination. Customer Profile information includes that information discussed in this specification which would typically be provided by the Customer, such as IP addresses, services to be provided, etc. In contrast, Customer Network Profile information includes that information which is the result of testing.

Vulnerability Library

The Vulnerability Library 206 catalogs all the vulnerabilities that a preferred embodiment tests for. This library 206 can be used by the Report Generator 110 to tell the customers what security vulnerabilities they have. The data associated with each vulnerability can also indicate the classification of the vulnerability as to its severity. Severity has several aspects, for example, risk of the vulnerability being exploited can be high, medium, or low; skill level to exploit the vulnerability can be high, medium, or low; and the cause of the vulnerability can be vendor (for example, bugs), misconfiguration, or an inherently dangerous service.

Performance Metrics

Different types of performance metrics 208 can be stored for each test. Reasons that the system stores performance metrics 208 include, for example, in order to be able to plan for future scaling of the system and to track the durations and efficiency levels of the tests 516. Performance metrics 208 allow determination, for example, of when system capacity can be expected to be reached and when more Testers 502 can be expected to be needed added to Tester array 103 to maintain adequate performance capacity.

The ability to perform performance metrics 208 comes from two places: (1) utilizing standard network utilities and methodologies, and (2) analysis of database 114 information. More sources of the ability to perform performance metrics 208 will become available over time. Current performance metrics 208 include, job completion timing, which is (1) time to complete an overall assessment (can be compared with type of assessment as well as size of job); (2) time to complete each Tool Suite 9 e.g., HTTP Suite 2318); (3) time to complete each wave of tests 516; and (3) time to complete each test 516. Also, assessment time per IP address/active nodes assessment time per type of service active on the machine. Tester 502 performance metrics 208 include, for example, resources available/used, memory, disk space, and processor. Gateway 118 performances metrics 208 include, for example, resources available/used, memory, disk space, and processor. Other performance metrics 208 include, for example, communication time between Tester 502 and Gateway 118 (latency), communication time between Gateway 118 and Tester 502 (network paths are generally different), and bandwidth available between Tester 502 and Gateway 118. Future performance metrics might include, Tester 502 usage, by operating system, by Network (Sprint, MCI, etc.), IP address on each Tester 502; test 516 effectiveness by operating system, by Network, by Tester 502; and Gateway 118/Distribution of tests across Testers 103.

Report Elements

Report Elements 210 are used to build reports 2230. The Report Elements 210 area of the Database 114 can hold these report elements 210 at their smallest resolution. The Report Generator 110 subsystem accesses the report elements 210 to create a customer vulnerability assessment report 2230. The Report Generator 110 reads the test results of a vulnerability assessment from the Database 114 and can use the test results to organize the Report Elements 210 into a full, customized report 2230 for the customer. All of the raw data 214 as well as the refined data 216 about a customer network 1002 can be stored in the Database 114 in a normalized secure form which is fragmented and has no meaning until the Report Generator 110 decodes the data and attaches a Report Element 210 to each piece of information. The Report Elements 210 enable the reports 2230 to contain meaningful, de-normalized information and allow the Database 114 to maintain the original data in a manageable format.

Some Report Elements 210 can be the same as, directly based on, or indirectly based on information from Vulnerability Library 206.

The Report Elements 210 typically compose a very large set of text records which can make up all possible text passages that can eventually appear in a report 2230.

Customer's Network Profile, Raw Data, and Refined Data

All data collected by the basic tests can be stored in their raw form 214 on an ongoing basis. The data can be used by the Report Generator 110 and by data mining tools. The Report Generator 110 can use this data to provide historical security trending, detailed analysis and current vulnerability assessment reports 2230. Data mining can provide security trend analysis across varying network sizes and industries. Other data mining opportunities can present themselves as the number of customers grows. The Early Warning Generator 112 can reference the most recent information about a customer network 1002 in order to alert only threatened customers about the newest relevant security vulnerabilities found.

Report 2230 metrics can also be used to classify test results for different market segments and industries to be able to calcify risk boundaries. For example, this would enable an insurer to change insurance rates based on risk metrics indicators.

In addition, the raw information 214 can be used by experienced security consultants to give themselves the same intimate familiarity with the customer's network 1002 that they would normally gain during a manual test 516 but without actually having to perform the tests 516 themselves. This can allow security personnel to leverage their time more efficiently while maintaining quality relationships with customers.

Command Engine Subsystem Functionality

Figuratively, the Command Engine 116 is the "brain" that orchestrates all of the "basic tests" 516 into the security vulnerability attack simulation used to test the security of customer systems and networks 1002. While the Command Engine 116 essentially mimics hackers, the tests 516 themselves should be harmless to the customer. Each basic test 516 can be a minute piece of the entire test that can be launched independently of any other basic test 516. The attack simulation can be conducted in waves, with each wave of basic tests 516 gathering increasingly fine-grained information. The entire test can be customized to each customer's particular system 1002 through automatic modifications to the waves of basic tests 516. These modifications occur in real-time during the actual test in response to information collected from the customer's systems and networks 1002. For example, the information can include security obstacles and system environment information. The Command Engine 116 stores the raw test results 214 in the Database 114 for future use as well as uses the collected data to modify the attack/test strategy. This test process is iterative until all relevant customer data can be collected. Note that there is no reason why the functions of the Command Engine 116 could not be performed by and incorporated into the Database 114 in an alternative embodiment. Such a device, combining Database 114 and Command Engine 116 functions might be called a Command Database 1702.

Check Schedule

The Check Schedule module 302 polls the Job Scheduling module 202 to determine whether a new test 516 needs to be conducted. The Check Schedule module 302 then passes the customer profile information 204 for the new tests 516 to the Test Logic module 304.

Test Logic

The following discussion describes a multiple wave entire test. The Test Logic module 304 receives the customer profile information 204 from the Check Schedule module 302. Based on the customer profile 204, the Test Logic module 304 determines which basic tests 516 need to be launched in the first wave of testing and from which Testers 502 the basic tests 516 should come. The Test Logic module 304 uses the customer profile 204 to assemble a list of specific tests 516; the Test Logic module 304 uses the Resource Management module 308, which tracks the availability of resources, to assign the tests to specific Testers 502. As the basic tests 516 are determined, they are passed with instructions to the Tool Initiation Sequencer 312 where all of the tool 514 details and instructions are combined. Each sequence of basic test instructions proceeds from the Tool Sequencer 312 to the Queue 310 as an instruction for a specific Tester 502 to run a specific test 516. There is no reason why the Resource Management module 308 could not be part of Gateway 118 because such an alternative would be an example of the many alternatives that would not vary substantially from what has been described. Similarly, throughout this specification, descriptions of functionalities being in certain physical and/or logical orientations (e.g., being on certain machines, etc.), should not be considered as limitations, but rather as alternatives, to the extent that other alternatives of physical and/or logical orientations would not cause inoperability.

As the results of the basic tests 516 return 306, the Test Logic module 304 analyzes the information and, based on the information discovered, determines which basic tests 516 should be performed in the next wave of basic tests 516. Again, once the appropriate tests 516 have been determined, they are sent to the Tool Initiation Sequencer 312 where they enter the testing cycle.

Each wave of basic tests 516 becomes increasingly specific and fine-grained as more is learned about the environment 1002 being tested. This dynamic iterative process repeats and adapts itself to the customer's security obstacles, system configuration and size. The process ends when all relevant information has been collected about the customer system 1002.

Tool Management

The Tool Management module 314 manages all relevant information about the tools 514, possibly including classification 316, current release version, operating system dependencies, specific location 318 inside the Testers 502, test variations of tools, and all parameters 320 associated with the test. Because there can be thousands of permutations of testing available for each tool 514, the Test Logic module and the Initiation Sequencer 312 are data driven processes. The Tool Management 314, in conjunction with the Test Logic module 304, and the Initiation Sequencer 312 supplies the necessary detailed instructions to perform the basic tests 516. Tools 514 can be classified according to operating system or any other criterion or criteria. If a vulnerability becomes apparent for which no tool 514 currently exists, then a new tool 514 can be written in any language and for any operating system that will test for that vulnerability. The new tool 514 might then be referred to as a proprietary tool.

Tool Initiation Sequencer

The Tool Initiation Sequencer 312 works in conjunction with the Test Logic module 304 and the Tool Management module 314. It receives each sequence of instructions to run a specific basic test 516 from the Test Logic module 304. This information can be then used to access the Tool Management module 314 where additional information, such as tool location 318 and necessary parameters 320, can be gathered. The Tool Initiation Sequencer 312 then packages all relevant information in a standardized format. The formatted relevant information includes the detailed instructions that can be put in the Queue 310 to be polled by the Gateway 118 or pushed to the Gateway 118.

Queue of Test Tools

The Queue 310 is a mechanism that allows the Gateway 118 to poll for pending instructions to pass on to the Testers 502. The instructions for each basic test 516 can be stored as a separate order, and instructions for basic tests 516 belonging to multiple customer tests can be intermingled in the Queue 310 freely.

Tools Test Output

The results of each basic test 516 are returned from the Testers 502 to the Command Engine's 116 Tool/Test Output module 306. This module 306 transfers the test results to two locations. The information can be delivered to the Database 114 for future report generation use and recycled through the Test Logic module 304 in order to be available to adapt a subsequent wave of tests 516.

Resource Management

The Resource Management module 308 manages Tester 502 availability, Internet route availability, basic test 516 tracking, and multiple job tracking for entire tests being performed for multiple customer networks 1002 simultaneously. Tracking the availability of Testers 502 and Internet routes enables the testing to be performed using the most efficient means. Basic test 516 and job test tracking can be used to monitor for load on Testers 502 as well as the timeliness of overall jobs. The information used to manage resources can be gained from the Gateway 118 and from the Testers 502, via the Gateway 118.

Resource management information can be provided to the Test Logic module 304 and the Tool Initiation Sequencer 312. If a Tester 502 becomes unavailable, this information can be taken into account and the Tester 502 is not used until it becomes available again. The same can be true for periods of Internet route unavailability. Current basic tests 516 that relied on the unavailable resources would be re-assigned, and new basic tests 516 would not be assigned to resources that are unavailable.

The Gateway Subsystem Functionality

Functionally, the Gateway 118 can be partly characterized as the "traffic director" of a preferred embodiment. While the Command Engine 116 acts in part as the "brain" that coordinates the use of multiple tests 516 over multiple Testers 502, it is the Gateway 118 that interprets the instructions and communicates the directions (instructions) to all of the Testers 502. The Gateway 118 receives from the Command Engine 116 detailed instructions about basic tests 516 that need to be conducted at any given time, and it passes the instructions to appropriate Testers 502, in appropriate geographical locations, to be executed. The Gateway 118 can be a single and limited point of interface from the Internet to the Test Center 102, with a straightforward design that enables it to secure the Test Center 102 from the rest of the Internet. All information collected from the Testers 502 by the Gateway 118 can be passed to the Command Engine 116.

The Gateway 118 receives basic test 516 instructions from the Command Engine Queue 310 and sends these instructions to the appropriate Testers 502. The instruction sequence consists of two parts. The first part contains instructions to the Gateway 118 indicating which Tester 502 the Gateway 118 should communicate with. The second part of the instructions is relevant to the Tester 502, and it is the second part of these instructions that are sent to the appropriate Tester 502.

Figure 4:
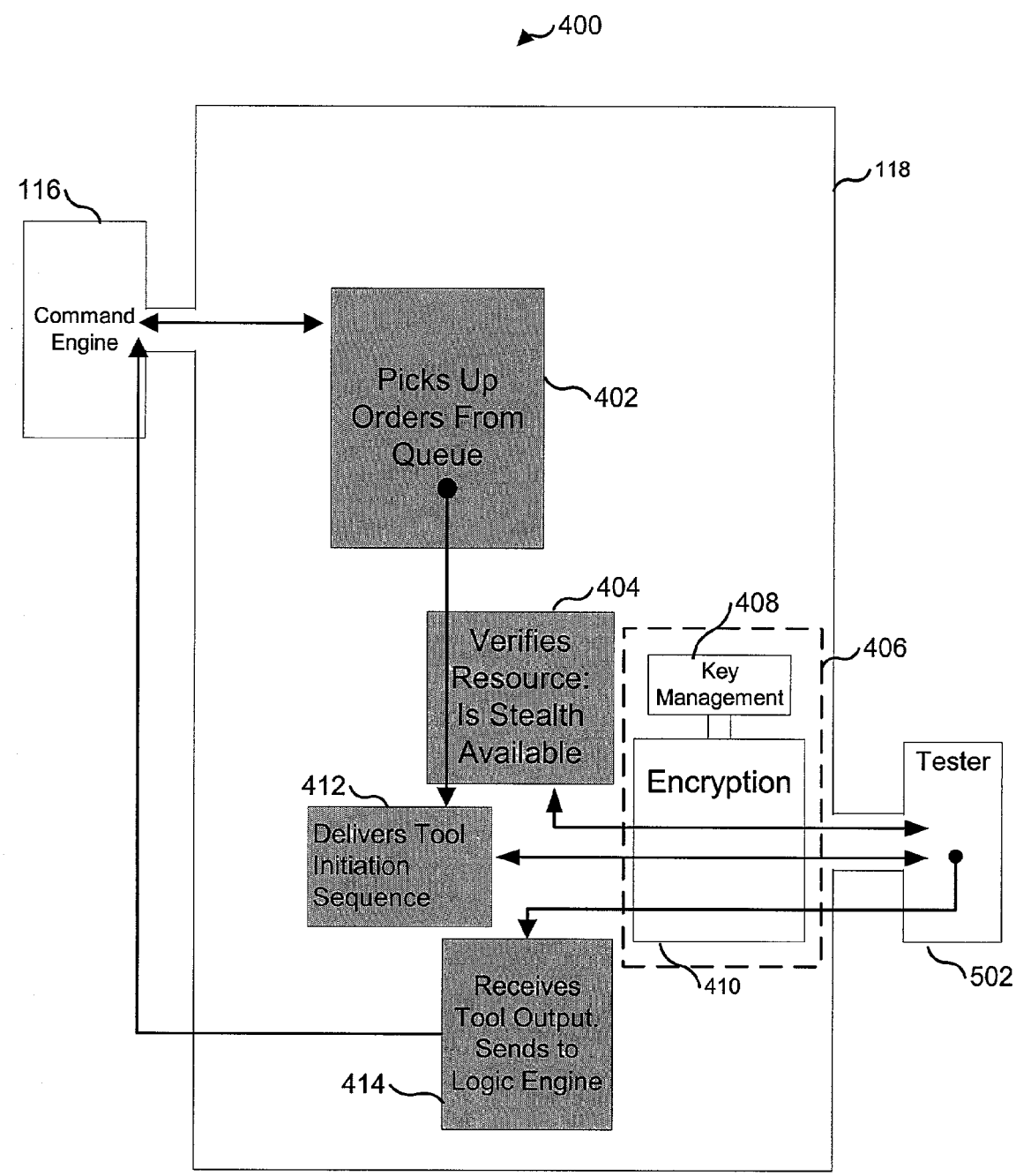
FIG. 4 depicts a block diagram of a Gateway, in accordance with a preferred embodiment of the present invention.

Prior to delivering the instructions to the Tester 502, the Gateway 118 verifies the availability of the Tester 502 and encrypts 406 the instruction transmission. In FIG. 4, encryption 406 uses key management 408 to achieve encryption 410, but other encryption techniques would not change the spirit of the embodiment. If communication cannot be established with the Tester 502, then the Gateway 118 runs network diagnostics to determine whether communication can be established. If communication can be established 404, then the process continues, otherwise, the Gateway 118 sends a message to the Command Engine Resource Management 308 that the Tester 502 is "unavailable". If the Gateway 118 is able to send 412 test instructions to the Tester 502, it does so. After the Tester 502 runs its basic test 516, it sends to the Gateway 118 the results 414 of the basic test 516 from the Tester 502 and relays the information 414 back to the Command Engine 116. The Gateway 118, as "traffic director", enables a set of tests 516 to be conducted by multiple Testers 502 and multiple tests 516 to be run by one Tester 502 all at the same time. This type of security vulnerability assessment is typically hard to detect, appears realistic to the security system, and can reduce the likelihood of the customer security system discovering that it is being penetrated.

An alternative to the test instruction push paradigm that has been described thus far is a test instruction pull paradigm. The pull approach is useful where the customer simply refuses to lower an unassailable defense. The Tester 502 would be placed within the customer's system 1002, beyond the unassailable defense, and would conduct its tests from that position. Rather than the sending of instructions from the Gateway 118 to the Tester 502 being initiated by the Gateway 118, the Tester 502 would repeatedly poll the Gateway 118 for instructions. If the Gateway 118 had instructions in its queue 402 ready for that Tester 502, then those instructions would be transmitted responsively to the poll.

The Tester Subsystem Functionality

Figure 5:
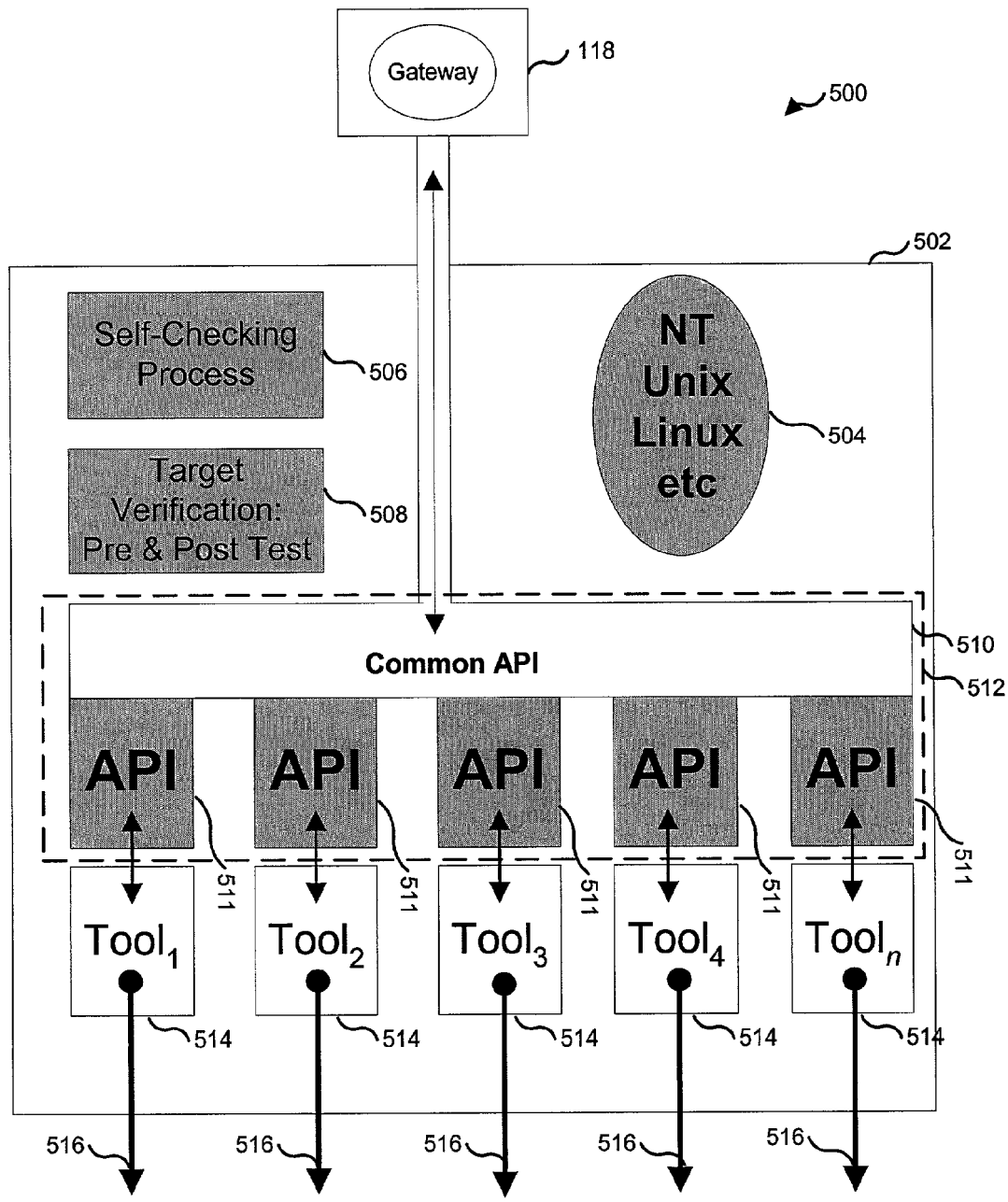
FIG. 5 depicts a block diagram of a Tester structure, in accordance with a preferred embodiment of the present invention.

Depicted in overview 500, FIG. 5, the Testers 502 can reside on the Internet, in a Web-hosted environment, or on customers' networks 1002, and can be distributed geographically around the world. Not only can the entire test be split up into tiny pieces, but it can also originate each piece from an independent point and is therefore harder to detect and more realistic. Even entire tests conducted monthly on the same customer can come from different Testers 502 located in different geographical areas.

The Testers 502 house the arsenals of tools 514 that can conduct hundreds of thousands of hacker and security tests 516. The Tester 502 can receive encrypted basic test instructions from the Gateway 118, via the Internet. The instructions inform the Tester 502 which test 516 to run, how to run it, what to collect from the customer system, etc. Every basic test 516 can be an autonomous entity that can be responsible for only one piece of the entire test that can be conducted by multiple Testers 502 in multiple waves from multiple locations. Each Tester 502 can have many basic tests 516 in operation simultaneously. The information collected by each test 516 about the customer systems 1002 can be sent to the Gateway 118.

Following is a partial list of hacker tools 514 that a preferred embodiment is adapted to use: (a) CGI-scanners such as whisker, cgichk, mesalla; (b) port scanners—nmap, udpscan, netcat; (c) administrative tools—ping, traceroute, Slayer ICMP; (d) common utilities—samba's nmblookup, smbclient; and (e) Nessus program for assessing a computer's registry.

The Testers 502 are independent entities working in concert, orchestrated by the Command Engine 116. Because they can be independent entities, they do not need to have the same operating systems 504. Utilizing various operating systems 504 can be an advantage in security vulnerability assessment, and assists a preferred embodiment in maximizing the strengths of all the platforms. This typically leads to more accurate assessments and more efficient operations.

Following are three examples of actual information returned by tools 514. The first tool 514 is Nmap port scanner, running in one of its variations:

Starting nmap V.2.53 by fyodor@insecure.org (www.insecure.org/nmap/)
Interesting ports on localhost (127.0.0.1):
(The 1502 ports scanned but not shown below are in state: closed)
Port State Service

| | | |
|---|---|---|
| 1/tcp | open | tcpmux |
| 11/tcp | open | systat |
| 15/tcp | open | netstat |
| 21/tcp | open | ftp |
| 22/tcp | open | ssh |
| 23/tcp | open | telnet |
| 25/tcp | open | smtp |
| 53/tcp | open | domain |
| 79/tcp | open | finger |
| 80/tcp | open | http |
| 635/tcp | open | unknown |

-continued

| | | |
|---|---|---|
| 1080/tcp | open | socks |
| 8/tcp | open | squid-http |
| 12345/tcp | open | NetBus |
| 12346/tcp | open | NetBus |
| 31337/tcp | open | Elite |

Nmap run completed—1 IP address (1 host up) scanned in 2 seconds.

The second tool 514 is whisker—web cgi script scanner:
-- whisker/v1.4.0+SSL/rainforestpuppy/www.wiretrip.net--
-(Bonus: Parallel support)
= = = = = = =
=Host: 127.0.0.1
- Server: Microsoft—IIS/4.0
+200 OK: HEAD/_vti_inf.html
+200 OK: HEAD/_private/form_results.txt The third tool 514 is icmp query for remote time stamp and remote subnet of a computer:
./icmpquery -t 127.0.0.1
127.0.0.1: 17:17:33
127.0.0.1: 0xFFFFFFE0

Inside each Tester 502 can be storehouses, or arsenals, of independent hacker and security tools 514. These tools 502 can come from any source, ranging from pre-made hacker tools 514 to proprietary tools 514 from a development team. Because the Testers 502 can be NT, Unix, Linux, etc 504, the tools 514 can be used in their native environment using an application programming interface (API) 512, described elsewhere in this specification, with no need to rewrite the tools 514. This usage gives a preferred embodiment an advantage in production. For example, hacker tools 514 that are threatening corporations everywhere can be integrated into a preferred embodiment the same day they are published on the Internet. The API 512 also serves to limit the quality control testing cycle by isolating the new addition as an independent entity that is scrutinized individually. Additionally, because tools 514 can be written in any language for any platform 504, the development of proprietary tools 514 need not be dependent on a lengthy training cycle and might even be outsourced. This ability is a significant differentiator for a preferred embodiment.

Running the tools 514 from a separate tool server would be possible using a remote mount.

The API 512 handles the things that are common among all the tools 514 that we have on a Tester 502. Typically each tool wrapper will have commonly named variables that have specifics about the particular tool wrapper. The API 512 will use these variable values to do specific, common functionality, such as "open a file to dump tool results into". In that example, the wrapper would simply call API::OpenLogFile. At this point the API 512 would be invoked. In that example, the API 512 will look at the values of the variables from the main program that called it. These variables will have the specifics of the particular wrapper. The API 512 will then open a log file in the appropriate directory for the program to write to. For example, the commands:

$Suite ='http';
$Tool ='cgiscan';

would produce something similar to the following:
/var/achilles/http/cgiscan/scanlog/J2334_T4234

Other common functionality can be handled by the API 512. For example when a tool 514 has completed and its information has been parsed, each wrapper can call the same function that initiates a connection back the Gateway 118 and deposits the parsed info on the Gateway 118 for pickup by the Command Engine 116. Example: The tool wrapper simply calls the function API::CommitToGateway (filename) and the API 512 is responsible for opening the connection and passing the info back to the Gateway 118, all with error handling.

Other functionality includes but is not limited to: retrieving information passed to the tool 514 via command line parameters (Job Tracking ID, Tool Tracking ID, Target Host IP Address, etc.); Opening, Closing, and Deleting files; Error/Debug Logging Capability; Character substitution routines; etc.

The system's capacity to conduct more tests for multiple customers at the same time can be increased dramatically by adding more Testers 502.

Internal Tester

Internal Tester machines 502 are for the vulnerability assessment of an internal network, DMZ, or other areas of the network 1002. The performance of an internal assessment can give a different view than just performing an external assessment. The resulting information can let an administrator know, if a cyber attacker were to perform an attack and gain access to network 1002, what other machines, networks or resources the attacker would have access to. In addition, internal assessments can be conducted with administrative privileges thereby facilitating audit of individual workstations for software licensing, weak file permissions, security patch levels, etc.

For the purposes of an internal assessment, several different appliances can be deployed on the customers network 1002. For example, for traveling consultants, a pre-configured laptop computer loaded with an instance of a Tester 502 might be shipped for deployment. For permanent, continuous assessment installations a dedicated, pre-configured device in either a thin, rack mountable form or desktop style tower might be shipped for deployment. In both cases the device might boot out-of-the-box to a simple, graphical, configuration editor. The editor's interface is a web browser that might point to the active web server on the local loop-back device. Since the web server would be running on the loop-back device, it could only be accessible by the local machine. Some options of local configurations might include, for example: IP Stack configuration, DNS information, default route table, push/pull connection to Test Center 102, account information, etc. Other options in the local configuration might include for example: IP diagnostics (Ping, Trace Route, etc.), DNS Resolutions, connections speed, hardware performance graphs, etc.

Once local configuration has been completed and the Tester 502 verified to be active on the local network with some form of connectivity to the Internet, the web browser then can switch from the local web to a remote web server of a preferred embodiment. At this point the specifications of the test might be entered. If this were a single assessment, the IP range, Internet domain name, package type and company information might be necessary. For a continuous/permanent installation, other options might include frequency, re-occurrence, etc. Minor updates might be performed via a preferred embodiment upgrade systems. Major upgrades might be initiated for example by the traveling consultant prior to going to the customer's site or, in the case of a permanent installation, remotely initiated during a scheduled down time.

The actual assessment might be similar to the remote assessment, however distributed capabilities would not be needed. Other future, add-on modules might include: registry readers for auditing of software licenses, modules for asserting file permissions, policy management modules, etc.

Defending the Tester

The use of a distributed architecture can mean placing out Testers 502 in hostile environment(s). Safeguards, policies, and methodologies should be in place to ensure the Integrity, Availability, and Confidentiality of the technology of a preferred embodiment.

While the internal mechanisms of the Testers 502 can be complex, the external appearance can be simple by contrast. Each Tester 502 can be assigned one or more IP addresses; however, it could be that only the primary IP address has services actually running on it. These minimal services can be integral to the Tester 502. The remaining IP addresses would have no services running on them. Having no services running means that there is no opportunity for an external attacker to gain access to the Tester 502. In addition, there are several processes that are designed to keep the environment clean of unknown or malicious activity.

Each Tester 502 can be pre-configured in-house and designed for remote administration. Therefore, it would typically be that no peripherals (e.g., keyboard, monitor, mouse, floppies, CD-ROM drives, etc.) are enabled while the Tester 502 is in the field. An exception might be an out-of-band, dial-up modem that might feature strong encryption for authentication, logging, and dial-back capabilities to limit unauthorized access. This modem could be used, for example, in emergencies when the operating system is not completing its boot strap and could be audited on a continuous basis. This could limit the need for "remote-hands" (e.g., ISP employees) to have system passwords, and would reduce the likelihood of needing a lengthy on-site trip. Other physical security methods, such as locked computer cases, can be implemented. One example might be a locked case that would, upon unauthorized entry, shock the hardware and render the components useless.

Until the integrity of Tester 502 can be verified by an outside source, it would be the case that no communication with the device will be trusted and the device can be marked as suspect. Confidence in integrity can be improved by several means. First of all, Tester's 502 arsenals of tools 514, both proprietary and open source, can be contained on encrypted file systems. An encrypted file system can be a "drive" that, while unmounted, appears to be just a large encrypted file. In that case, when the correct password is supplied, the operating system would mount the file as a useable drive. The can prevent for example an unauthorized attacker with physical access to the Tester 502 from simply removing the drive, placing it into another machine and reading the contents. In that case, the only information an attacker might have access to might be the standard build of whatever operating system the Tester 502 happened to be running. If used, passwords can be random, unique to each Tester 502, and held in the Test Center 102. They can be changed from time to time, for example, on a bi-weekly basis.

To protect the contents of the operating system itself, the contents can be verified before placing the Tester 502 in operation. For example, using a database of cryptographically calculated checksums the integrity of the system can be verified. Using that methodology, the "last known good" checksum databases can be held offsite and away from the suspected machine. Also, tools to calculate these sums can not stored on the machine because they might then be altered by a malicious attacker to give a false positive of the integrity of the suspected Tester 502.

Upon boot, the Tester 502 can send a simple alert to the Gateway 118 indicating it is online. The Gateway 118 can then issue a process to verify the integrity of the operating system. The process can connect to the Tester 502, upload the crypto-libraries and binaries, perform the analysis, and retrieve the results. Then the crypto-database can be compared to the "Last Good" results and either approve or reject the Tester 502. Upon rejection the administrator on call can be notified for manual inspection. Upon approval, the process can retrieve the file system password and use an encrypted channel to mount the drive. At this point the Tester 502 can be considered an extension of the "Test Center 102" and ready to accept jobs. This verification process can also be scheduled for pseudo-random spot checks.

Security typically requires vigilance. Several processes can be in place to improve awareness of malicious activity that is targeting an embodiment of the invention. Port Sentries and Log Sentries can be in place to watch and alert of any suspicious activity and as a host-based intrusion detection system. Port Sentry is a simple, elegant, open source, public domain tool that is designed to alert administrators to unsolicited probes. Port sentry opens up several selected ports and waits for someone to connect. Typical choices of ports to open are services that are typically targeted by malicious attackers (e.g., ftp, sunRPC, Web, etc.). Upon connection, the program can do a variety of different things: drop route of the attacker to /dev/nul; add attacker to explicit deny list of host firewall; display a strong, legal warning; or run a custom retaliatory program. As such a strong response could lead to a denial of service issue with a valid customer, an alternative is to simply use it to log the attempt to the Tester 502 logs. Log sentry is another open source program that can be utilized for consolidation of log activity. It can check the logs every five minutes and email the results to the appropriate internet address.

According to the Information Security Management Handbook 4$^{th}$ Edition "There is no control over e-mail once it leaves the internal network, e-mail can be read, tampered with and spoofed". All e-mails from the Tester 502 can be encrypted, for example, with a public key before transport that improves the likelihood that it can only be read by authorized entities.

Any username and password combination is susceptible to compromise, so an alternative is to not use passwords. An option is that only the administrator account has a password and that account can only be logged on locally (and not for example through the Internet) via physical access or the out-of-band modem. In this scenario, all other accounts have no passwords. Access would be controlled by means of public/private key technology that provides identification, authentication, and non-reputability of the user.

To reduce the likelihood that data can be captured, all communication with the Testers 502 can be by way of an encrypted channel. Currently the module for communication can be Secure Shell (SSH1) for example. This could be easily switched to Open SSH, SSH2 or any other method. SSH provides multiple methods of encryption (DES, 3DES, IDEA, Blowfish) which is useful for locations where export of encryption is legally regulated. In addition, 2048 bit RSA encryption keys can be used for authentication methods. SSH protects against: IP spoofing, where a remote host sends out packets which pretend to come from another, trusted host; a "spoofer" on the local network, who can pretend he is your router to the outside; IP source routing, where a host can pretend that an IP packet comes from another, trusted host; DNS spoofing, when an attacker forges name server records; interception of clear text passwords and other data by intermediate hosts; and manipulation of data by people in control of intermediate hosts.

Self-Checking Process

Prior to accepting instructions to initiate a basic test 516, Testers 502 can undergo a Self-Checking Process 506 to verify that resources are available to perform the task, that the tool 514 exists in its arsenal, that the correct version of the tool 514 is installed, and that the security integrity of the Tester 502 has not been tampered with. This process 506 can take milliseconds to perform. Tester 502 resources that can be checked include memory usage, processor usage, and disk usage. If the tool 514 does not exist or is not the correct version, then the correct tool 514 and version can be retrieved by the Tester 502 from the RMCT 119, discussed elsewhere herein. Periodic testing can be conducted to confirm that the RMCT 119 retains its integrity and has not been tampered with.

Target Verification Pre and Post Test

Pre Test Target Verification 508 can used to detect when a Tester 502 cannot reach its targeted customer system 1102 in network 1002 due to Internet routing problems. Internet outages and routing problems can be reported back through the Gateway 118 to the Resource Management module 308 of the Command Engine 116, and the basic test 516 can be rerouted to another Tester 502 on a different Internet router.

Post Test Target Verification 508 can be used to detect if the Tester 502 has tripped a defensive mechanism that might prevent further tests from gathering information. This can be particularly useful for networks 1002 with a Firewall/Intrusion Detection System combination. If the Tester 502 was able to connect for the pre test target verification 508, but is unable to connect for the post verification 508 it is often the case that some defensive mechanism has been triggered, and a preferred embodiment therefore typically infers that network defenses have perceived an attack on the network. Information that the defense has been triggered is sent through the Gateway 118 to the Command Engine 116 in order to modify the basic tests 516. This methodology results in the ability to trip the security defenses, learn about the obstacles in place, and still accurately and successfully complete the security assessment.

Tester 502 is merely illustrative, and could be Tester 120, for example; in that case, operating system 504 would be Linux and Tester 502 would be located in New York. Of course, there is no reason why one or more additional Testers 502 could be located in New York and have the Linux operating system.

Tools and API

In detail, the API 512 for each tool 514 includes two kinds of components: an API stub 511 and a common API 510. The API stub 511 is specifically adapted to handle the input(s) and output(s) of its tool 514. The common API 510 is standard across all tools 514 and performs much of the interfacing between the Instructions and the tools 514.

As tools 514 can come from many sources—including in-house development, outsourced development, and open-source hacker and security sites—flexibility in incorporating new tools 514 into a testing system is critical for maintaining rapid time to market. The API 512 serves to enable rapid integration time for new tools regardless of the language the tool 512 is written in or the operating system 504 the tool 514 is written for.

The API 512 standardizes the method of interfacing to any tool 514 that can be added to a preferred embodiment by implementing common API 510. Using the API 512, each tool 514 can be integrated into a preferred embodiment through the addition of a few lines of code implementing API stub 511. Integration of a new tool 514, after quality assurance testing, can be completed within hours. This is a significant differentiator and time to market advantage for a preferred embodiment.

Each tool 514 should be tested before being integrated into a preferred embodiment in order to protect the integrity of a preferred embodiment system. The use of the API 512 to interface between the Gateway 118 and the tool 514 residing on the Tester 502 reduces testing cycles. The API 512 is an important buffer that allows the tools 514 to remain autonomous entities. In a standard software scenario, the entire software system should be rigorously tested after each change to the software, no matter how minute. For a preferred embodiment, however, the API 512 keeps each tool 514 as a separate piece of software that does not affect the rest of a preferred embodiment. The API 512 passes the instructions to the tool 514, and the API 512 retrieves the results from the tool 502 and passes them back to the Gateway 118. This methodology effectively reduces testing cycles by isolating each new tool 514 as a quality assurance focal point while maintaining separation between the integrity of each tool 514 and the integrity of a preferred embodiment.

Figure 21:
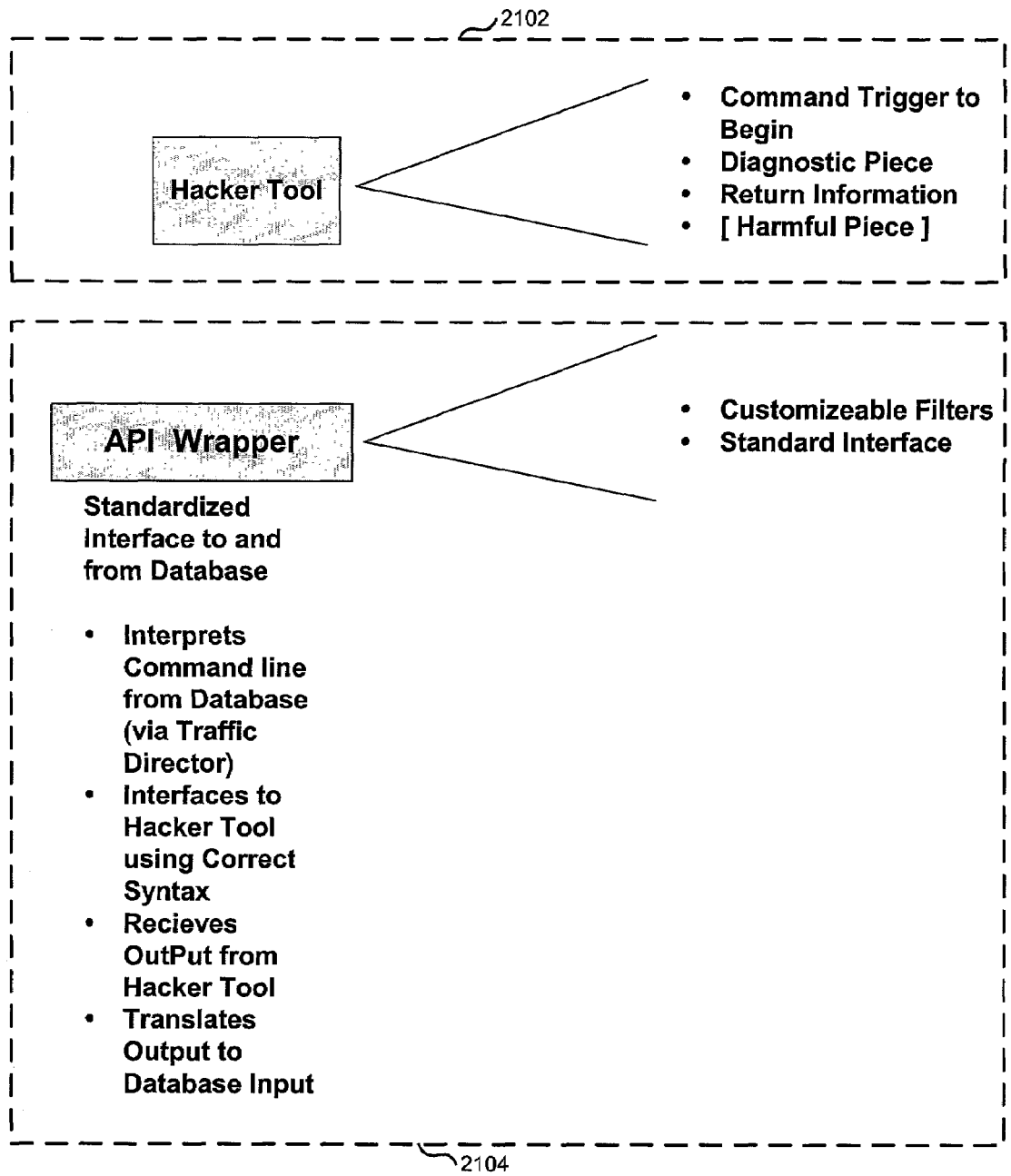
FIG. 21 depicts a diagram of a logical conception of the relationship between a hacker tool and an application programming interface (API) wrapper, in accordance with a preferred embodiment of the present invention.

Logical overview 2100 in FIG. 21 shows a logical view of the complimentary functions of tools 514 and the API 512 wrapper. Diagram section 2102 shows a symbolic hacker tool 514 and emphasizes that a command trigger causes the hacker tool 514 to run the diagnostic piece 516 that is executed to gather information, and the information is returned, in this case, to the Gateway 118. The brackets around the harmful activity that the tool 514 performs indicate that the harmful part of the hacker tool does not damage the system 1102 in network 1002 under test. Diagram section 2104 illustrates the some of the functionality of the API 512 wrapper. Emphasizing that the information filters and command filters are customizable, providing a standard interface 510 across all hacker tools 514. That is, the interface 510 between the tools 514 and the Command Database 1702 from the Command Database 1702 perspective is a standardized interface. The API 512 interprets the command from the Command Database 1702 via the Gateway 118, interfaces to the hacker tool 514 using the correct syntax for that particular hacker tool 514, and receives output from the hacker tool 514, and translates that output to the Command Database 1702 input to be stored as raw information 214. It should be noted that in FIG. 21 the network vulnerability assessment system is using a Command Database 1702 which combines the functionality of a Command Engine 116 and a Database 114.

The API-integration of tools 514 is a big differentiator and time to market advantage for a preferred embodiment. The use of the tools 514 in their native environment and the use of the API 512 often allows a preferred embodiment to be adapted to use a new tool 514 in the same day it is found, for example in the Internet. The API 512 also isolates quality assurance testing to further shorten time to market. While a different approach can require months to adapt new tools 514, a preferred embodiment adapts to those same tools 514 in hours.

The API 512 can also normalize test results data that can become part of customer/network profile 212. The test results can be referred to as "denormalized." In contrast, "normalized" data can be in binary format that is unreadable without proper decoding. Typically, customer network profile 212 would be stored in normalized format.

Report Generator Subsystem Functionality

Figure 6:
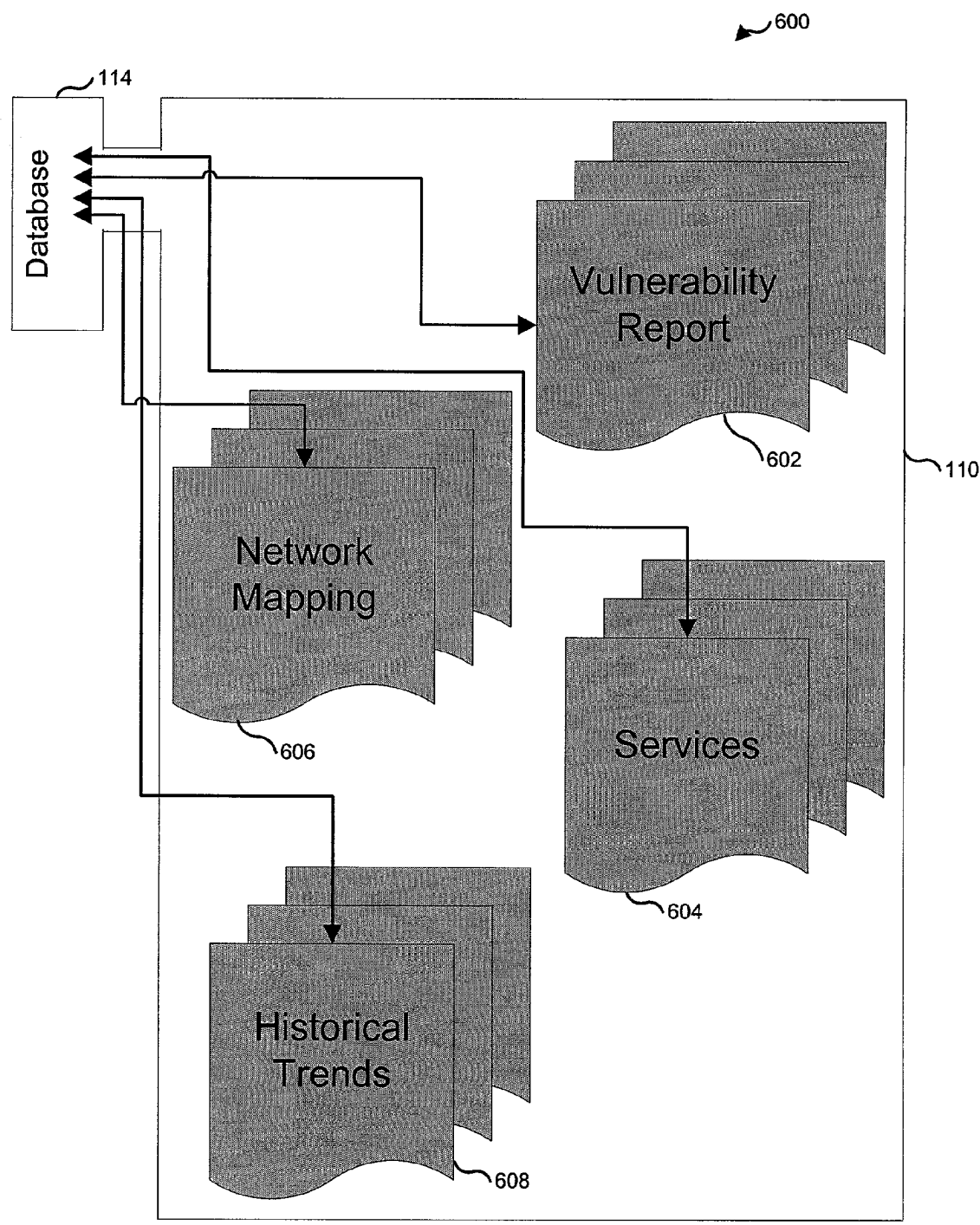
FIG. 6 depicts a block diagram of a Report Generator, in accordance with a preferred embodiment of the present invention.
Figure 7:
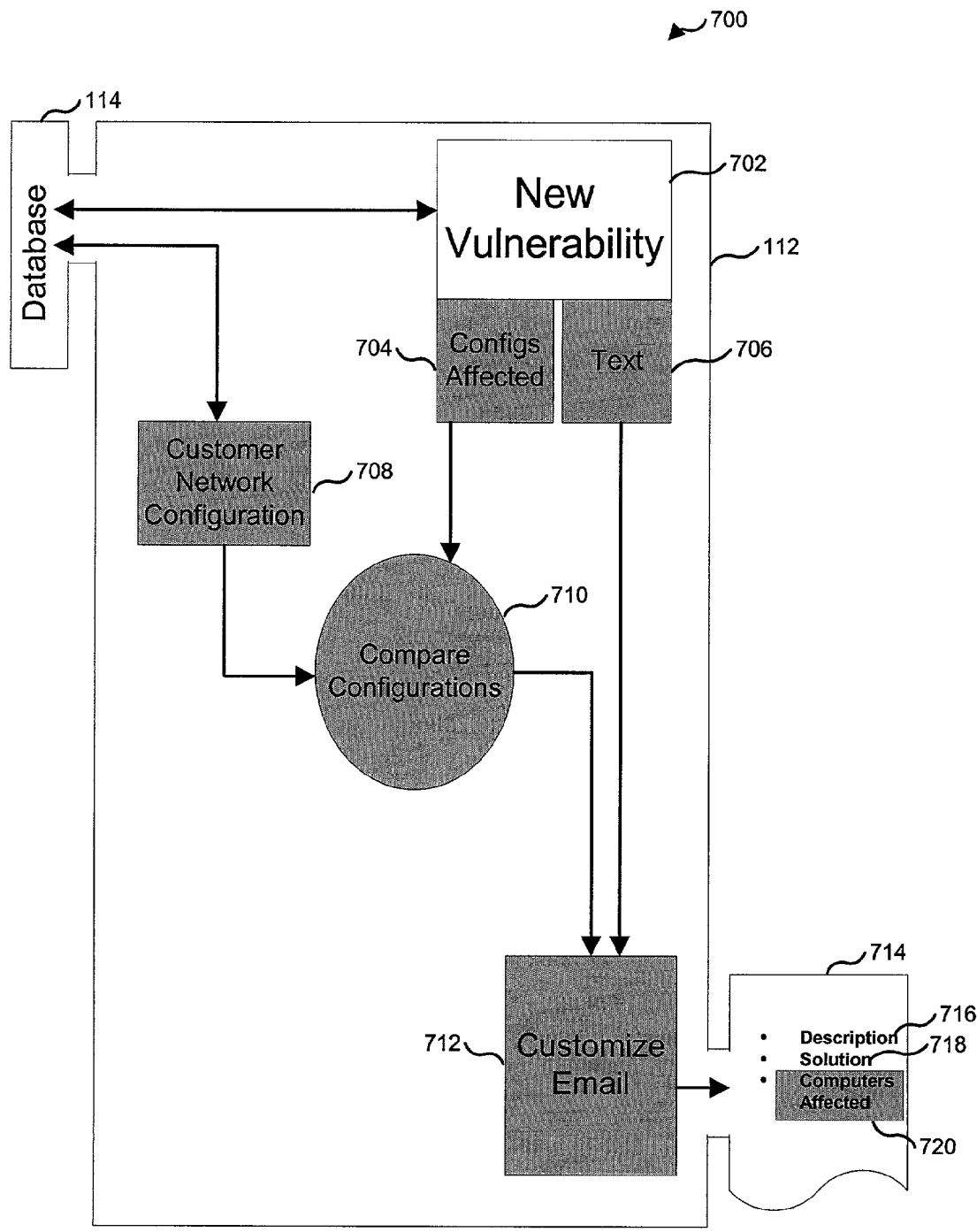
FIG. 7 depicts a block diagram of a Early Warning Generator, in accordance with a preferred embodiment of the present invention.
Figure 8:
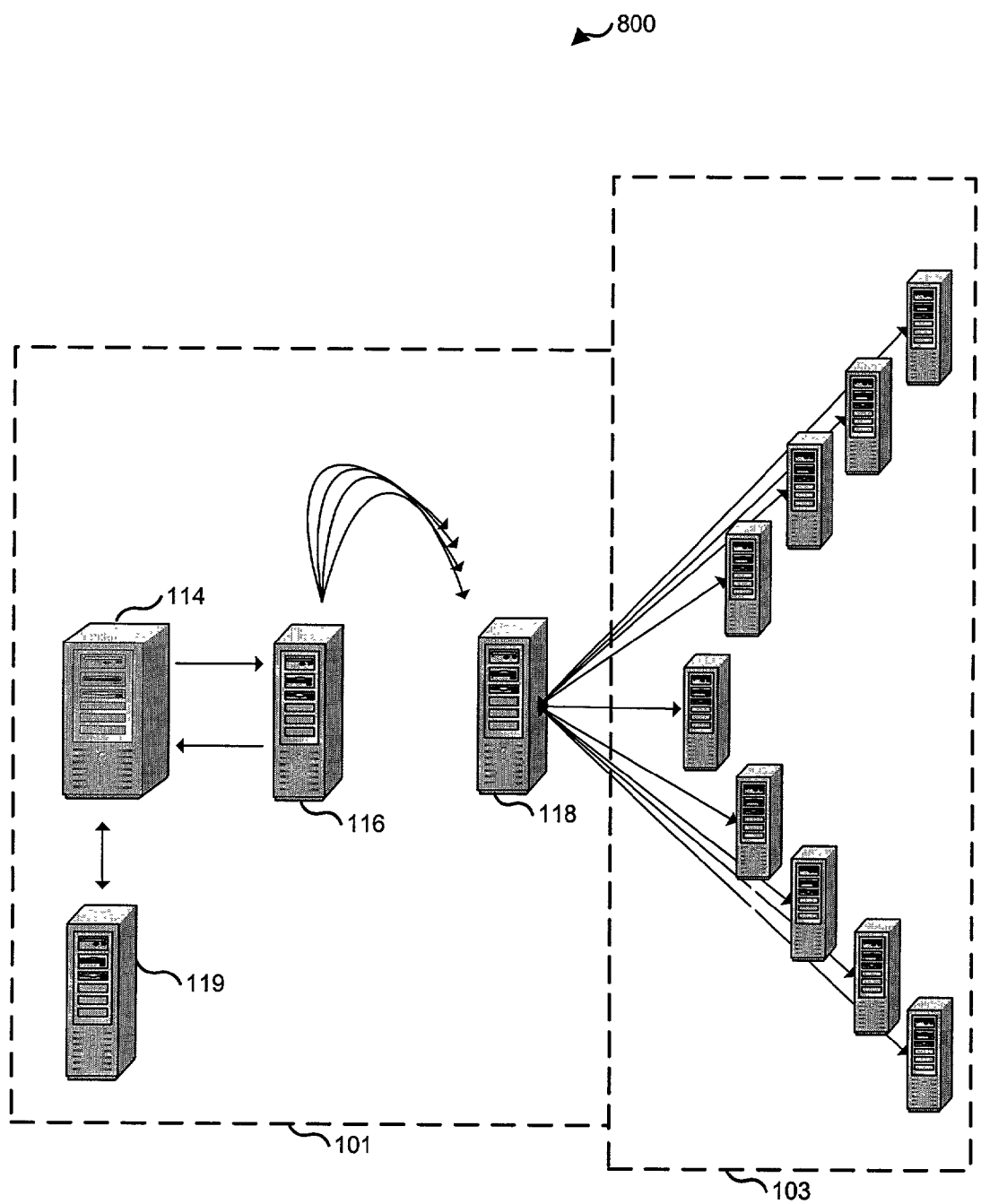
FIG. 8 depicts a diagram of an overview of a network vulnerability assessment system adapted to update tools using a Repository Master Copy Tester (RMCT), in accordance with a preferred embodiment of the present invention.
Figure 9:
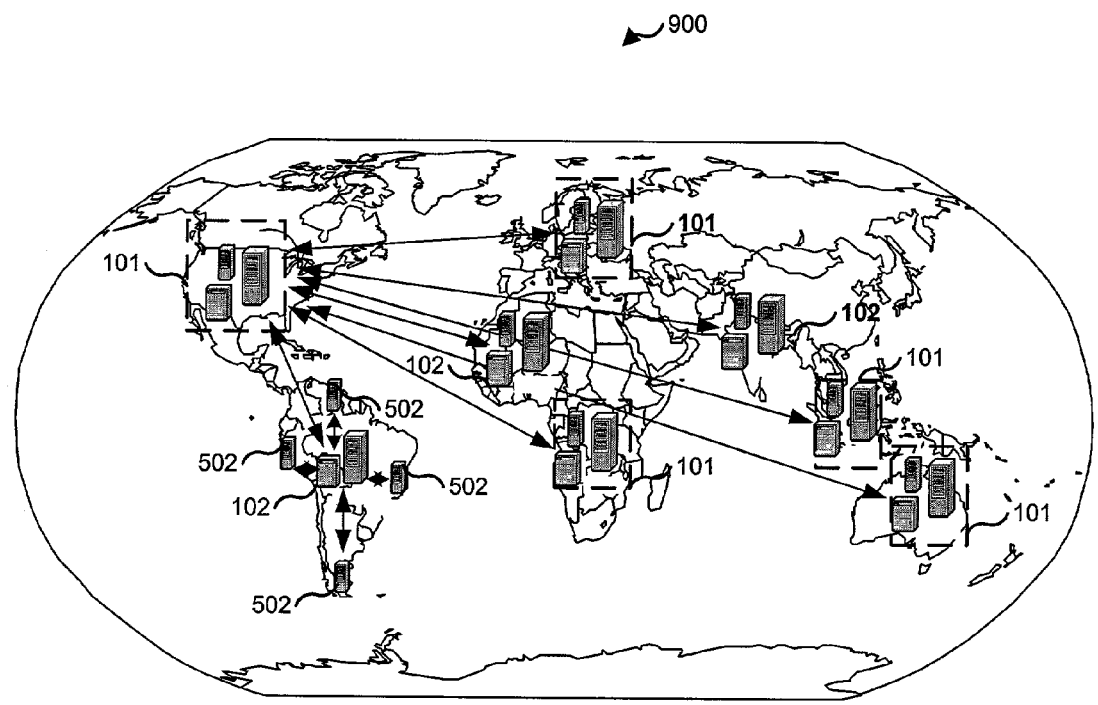
FIG. 9 depicts a diagram of an overview of an internationally disposed network vulnerability assessment system adapted to update tools using a RMCT, in accordance with a preferred embodiment of the present invention.
Figure 10:
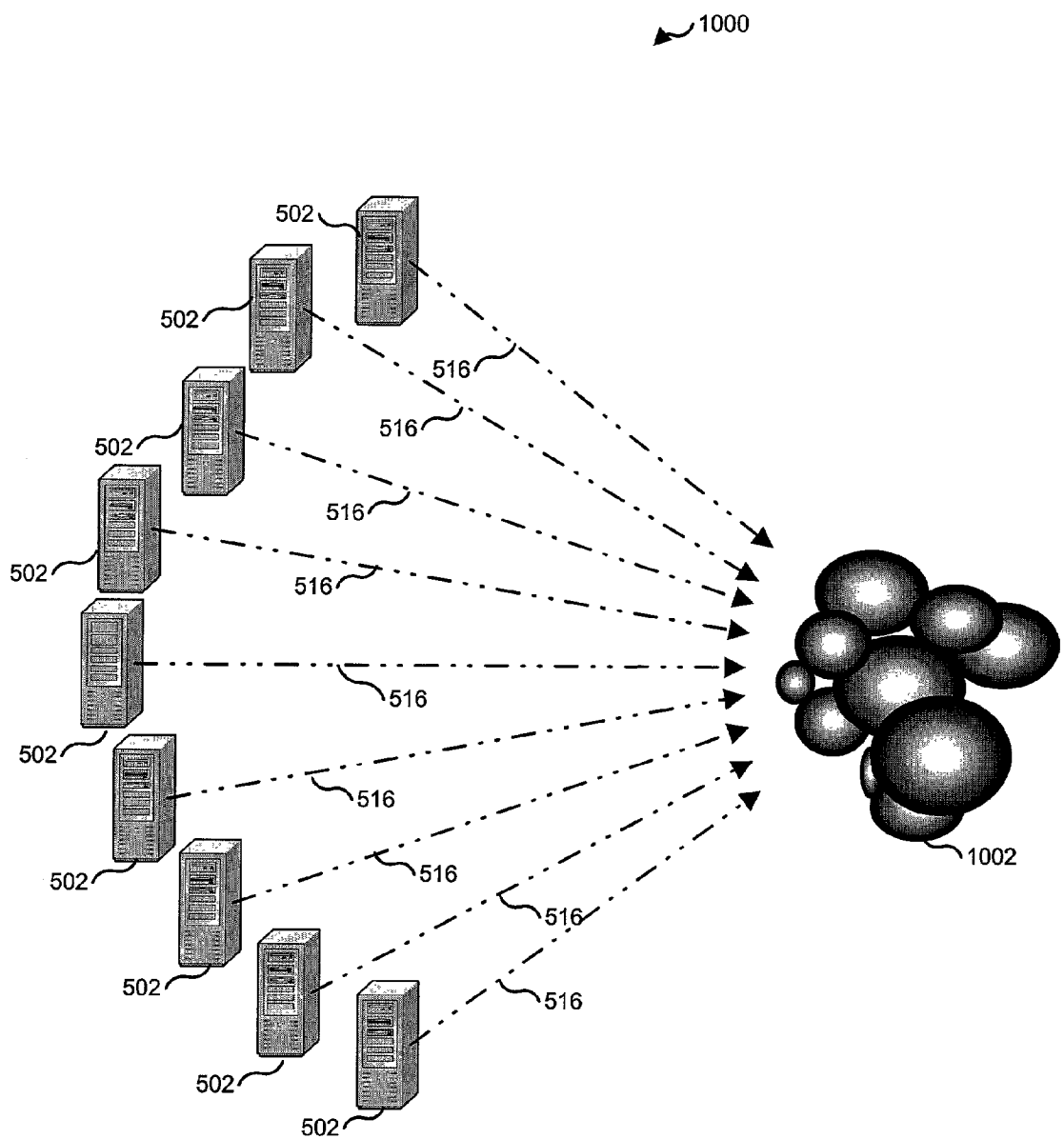
FIG. 10 depicts a diagram of a distributed test, in accordance with a preferred embodiment of the present invention.

Depicted in overview 600 of FIG. 6, the Report Generator 112 uses information collected in the Database 114 about the customer's systems 1002 to generate one or more reports 2230 about the systems profile, ports utilization, security vulnerabilities, etc. The reports 2230 can reflect the profile and frequency of security services specified for provision to each customer. Security trend analyses can be provided to the extent that customer security information is generated and stored periodically. The security vulnerability assessment test can be provided on a monthly, weekly, daily, or other periodic basis and the report can be provided, for example, in hard copy, electronic mail or on a CD. New reports will continuously evolve, without substantially varying a preferred embodiment. As the customer base grows, new data mining and revenue generation opportunities that do not substantially vary from a preferred embodiment can present themselves. A report 2230 might include, for example, a quantitative score for total network 1002 risk that might be useful to an insurance company in packaging risk so that cyber attack insurance can be marketed. A report 2230 could be provided in any desired language. The level of detail in which information would be reported might include, for example, technical level detail, business level detail, and/or corporate level detail. A report 2230 might break down information by test tool 514, by positive reports 2230, by network 1002 and/or system 1102 changes. A report 2230 might even anticipate issues that might arise based on provided prospective changes. Reports 2230, raw data 214, etc. could be recorded on, for example, CD for the customer. The customer would then be able to use the data to better manage its IS systems, review actual tests, generate work tickets for corrective measures (perhaps automatically), etc. The specific exemplary reports 2230 shown in overview 600 include Vulnerability Report 602, Services 604, Network Mapping 606, and Historical Trends 608.

In a preferred embodiment, the Report Generator 112 receives customer network profile 212 from the Database 114 which is in a binary format that is generally unreadable except by the Report Generator 112. The Report Generator 112 then decodes the customer network profile. The Report Generator 112 also receives the customer profile 204 from Database 114. Based on the customer profile 204 and customer network profile 212, the Report Generator 112 polls the Database 114 for selected Report Elements 210. The Report Generator 112 then complies a report 2230 based on the selected Report Elements 210.

Early Warning Generators Subsystem Functionality

Early Warning Generator subsystem 112 can be used to alert 714 relevant customers to early warnings on a periodic or aperiodic basis that a new security vulnerability 702 can affect their system. The alert 714 tells the customer which vulnerability 702 can affect them, which computers 1102 in their network 1002 are affected, and what to do to reduce or eliminate the exposure.

On a daily basis, for example, when new security vulnerabilities 702 are found by researchers or provided through other channels, a preferred embodiment compares 710 each configuration 704 affected by new vulnerability 702 against each customer's most recent network configuration test result 708. If the new vulnerability 702 can be found to affect the customer systems 1102 or networks 1002 then an alert 714 would be sent to the customer, for example, via e-mail 712. The alert 714 can indicate the detail 716 of the new vulnerability 706, which machines are affected 720, and/or what to do 718 to correct the problem. Only customers affected by the new security vulnerabilities 702 receive the alerts 714. This reduces the "noise" of the great number of vulnerabilities 702 that are frequently published, to just those that affect the customer.

Note that the steps of customizing e-mail 712 and notification 714 need not relate to e-mail technology, but can be any method of communicating information.

A customer would also have the option of tagging specific vulnerability alerts 714 to be ignored and therefore not repeated thereafter, for example, where the customer has non-security reasons to not implement corrective measures. Corrective measures that were to be implemented by the customer could be tracked, the responsible technician periodically reminded of the task, a report made upon completion of implementation of corrective measures, the effectiveness of corrective measures could be checked immediately by running a specific test 516 for the specific vulnerability 702 corrected.

Adding New Tools to a Preferred Embodiment

New security vulnerability assessment tools 516 can regularly be added to a preferred embodiment. The methodology of how to do this can be beneficial in managing a customer's security risk on timely basis.

The tools 514 themselves, with their API 512, can be added to the Tester's RMCT (again, Repository Master Copy Tester) 119. An RMCT 119 can be a Tester 502 located in the Test Center 102. These RMCTs 119 can be used by the Testers 502 that can be web-hosted around the world to obtain the proper copy. The name of the tool 514, its release number, environmental triggers, etc. can be added to the Command Engine's Tool Management module 314. Each vulnerability 702 that the new tool 514 checks for can be added to the Vulnerability Library 206. An addition may need to be made to the Database 114 schema so that the raw output 214 of the test is warehoused.

When a new test 516 is conducted, the Command Engine 116 uses the identifiers of the new tools 514 with their corresponding parameters inside the Tool Initiation Sequencer 312. The tool information is sent through the Gateway 118 to the Testers 502. The Tester 502 first checks 506 for the existence of the tool 514 instructed to run. If the tool 514 does not exist, it retrieves the install package with the API 512 from the RMCT 119. If the tool 514 does exist, it can verify that the version of the tool 514 matches with the version in the instruction set it received. If the instruction set version does not match the tool version, the Tester 502 retrieves the update package from the RMCT 119. In this manner the ability to update multiple Testers 502 around the world is an automated process with minimum work.

The RMCT 119 is part of the Test Center 101. The RMCT 119 can be protected since it is a device that is enabled to share the tools 514 with other machines. The RMCT 119 can communicate with Testers 502 through the Gateway 118, but that need not be the case in all embodiments. The RMCT 119 does not operate as a normal Tester 502. The RMCT's 119 purpose is to provide the updates (including version rollbacks) to the Tester 502. A possible version control software and communication might be Concurrent Versioning System (CVS) over Secure Shell (SSH). The performed embodiment might actually utilize any type of version control with any type of encryption or other similarly functioned technology. A preferred embodiment has the flexibility to utilize either pushing or pulling technology. Currently, a preferred embodiment includes a single RMCT 119: CVS is OS neutral as it stores the source code and binary executables for multiple OS's. However, the number of Testers 502 that need to be updated can exceed the ability of a single RMCT 119. To meet this potential need, the design of the system allows for multiple RMCTs 119.

VM Ware is a commercial program that enables multiple operating systems to run on the same computer. For example, VM Ware enables NT to run on a Linux box. The user has the ability to toggle back and forth without rebooting. The possibility of using VM Ware, or a similar product, exists to enable different operating systems to be used without the need for separate machines for each type of operating system.

Updating Additional Preferred Embodiment Systems

Preferred embodiment systems sold to customers can be equipped with the capability to receive automatic updates as part of their support services. These updates can include new tools 514 to test for new vulnerabilities 702 and newly researched or discovered vulnerabilities 702. These preferred embodiment systems can replicate the Early Warning Generator 112 system for their customers through these active updates. In this way all preferred embodiment systems are up-to-date on a frequent basis.

An effective way to manage security risk is to minimize the window of exposure for any new security vulnerability that affects customer systems. A preferred embodiment is a self-updating risk management system that can be virtually always up-to-date.

Overview diagram of an alternative embodiment 1700 depicts a network vulnerability assessment system in which the functionalities of the Command Engine 116 and the Database 114 are combined into one unit shown as Command Database 1702 which issues attack instructions 138 to Gateway 118 resulting in attack command 140 being transmitted to one of the three shown Tester server farms 1704.

A Preferred Embodiment Attack/Test Methodology

The Command Engine 116 operates as a data-driven process. This means that it can respond to and react to data or information passed to it. Information is passed through the Command Engine 116 as it is gathered from the systems being tested 1002. Responding to this information, the Command Engine 116 generates new tests 516 that can, in turn, provide additional information. This iterative process continues until testing has been exhausted. This methodology offers extreme flexibility and unlimited possibilities.

This framework was created so that as new methodologies or techniques are discovered they can be implemented easily. The following discussion gives examples of some of the different methodologies used by a preferred embodiment and that underscore the ability to react to the environment it encounters.

Having a distributed, coordinated attack that tests customer systems has several advantages over alternate vulnerability scanning methodologies.

A typical Intrusion Detection System (IDS) has various methodologies to identify cyber attacks. Various responses are possible: blocking further communications from the same IP address, for example.

There are alternatives around the problem of blocking by security devices. For example, the company performing the vulnerability assessment can coordinate with the corporation being tested. A door may need to be opened in the firewall to allow the testing to occur without interference. This situation may be less than ideal from a network administrator's standpoint as it creates a security weakness and consumes valuable time from the administrator. Another option can be to perform the vulnerability assessment on-site from inside the network. Internal vulnerability assessments will not be affected by the security devices. Internal assessments, however, do not indicate which devices are accessible from the Internet and are also limited to the capabilities of the software.

The distributed model can evade defensive security measures such as IDS. By being distributed, the assessment can be broken down into many basic tests 516 and distributed to multiple Testers 502. Since each machine only carries a minute part of the entire test, it is harder for defensive mechanisms to find a recognizable pattern. Firewalls and Intrusion Detection Systems rely on finding patterns in network traffic that reach a certain threshold of activity. These patterns are called attack signatures. By using the distributed model we are able to make the attack signature random in content, size, IP source, etc. so as to not meet typical predetermined thresholds and evade defenses. Hence this approach is figuratively referred to as "armor piercing". Additionally, each Tester 502 can actually have multiple source addresses to work with. This means that each Tester 502 is capable of appearing to be a different computer for each source address it has.

Basic tests 516, originating from various points on the Internet, provide a fairly realistic approach to security testing. Cyber attacks often stem from an inexperienced attacker simply trying out a new tool 514. The attacker can find a single tool 514 that exploits one specific service and then begin to scan the Internet, randomly choosing networks 1002 to target. Samples of firewall logs from corporations and individuals show this to be a common attack activity.

In addition, each basic test 516 takes up a very small amount of Tester 5-2 resources. Because of this, each Tester 502 can perform thousands of basic tests 516 at any given time against multiple networks 1002 simultaneously.

A preferred embodiment is very scalable. The transaction load can be shared by the Testers 502. As more customers need to be serviced and more tests 516 need to be performed, it is a simple matter of adding more Testers 502 to the production environment. In addition to the test approaches described, Bombardment is an option. In Bombardment, many Testers 502 are used to flood a system 1102 or network 1002 with normal traffic to perform a "stress test" on the system, called a distributed denial of service.

Frontal Assault

Figure 11:
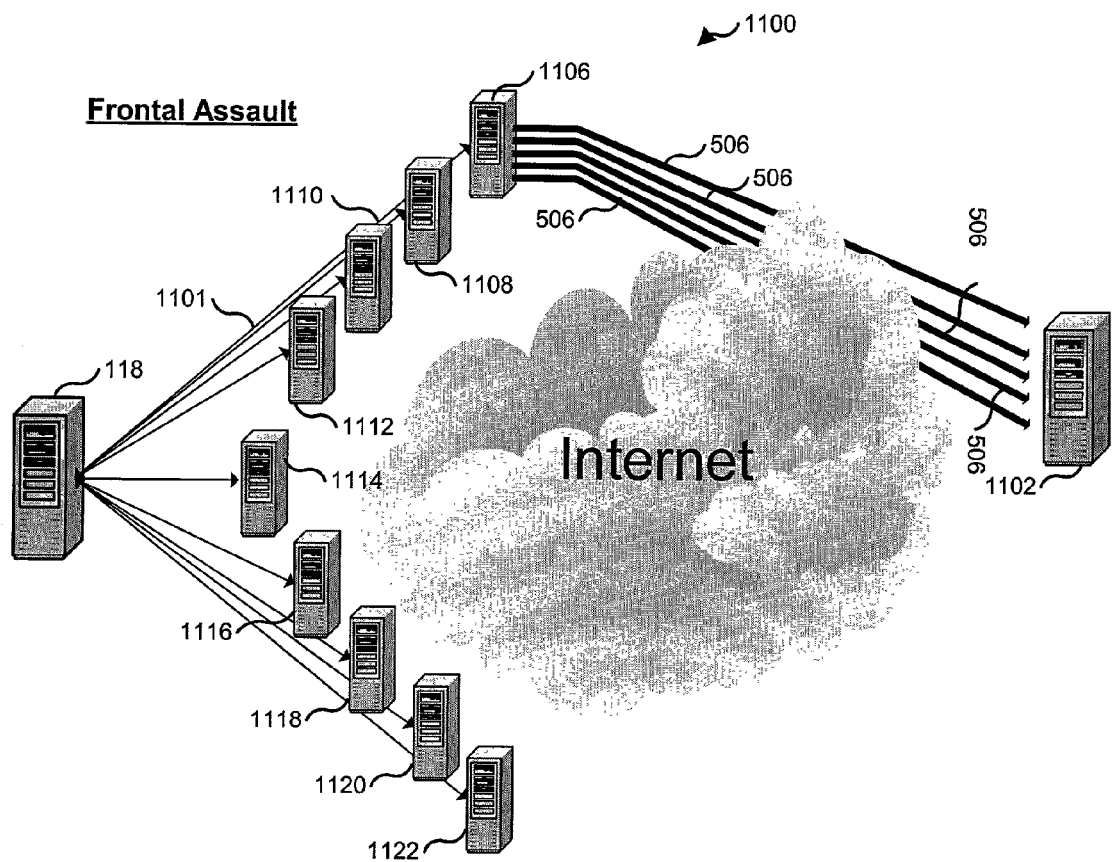
FIG. 11 depicts a diagram of a Frontal Assault test, in accordance with a preferred embodiment of the present invention.

Depicted in overview 1100 of FIG. 11, the Frontal Assault is designed to analyze networks 1002 that have little or no security mechanisms in place. As the name implies, this testing methodology is a straightforward, open attack that makes no attempt to disguise or hide itself. It is the quickest of methodologies available. Typically, a network 1002 with a moderate level of security can detect and block this activity. However, even on networks 1002 that can be protected, the Frontal Assault identifies which devices 1102 are not located behind the security mechanism. Mapping and flagging devices that are not behind security defenses gives a more accurate view of the network 1002 layout and topology. Test instruction 1101 is sent from Gateway 118 to Tester 1106 to launch all tests 516 at system 1102. Other Testers (1108 through 1122) are idle during the testing, with respect to system 1102.

Guerrilla Warfare

Figure 12:
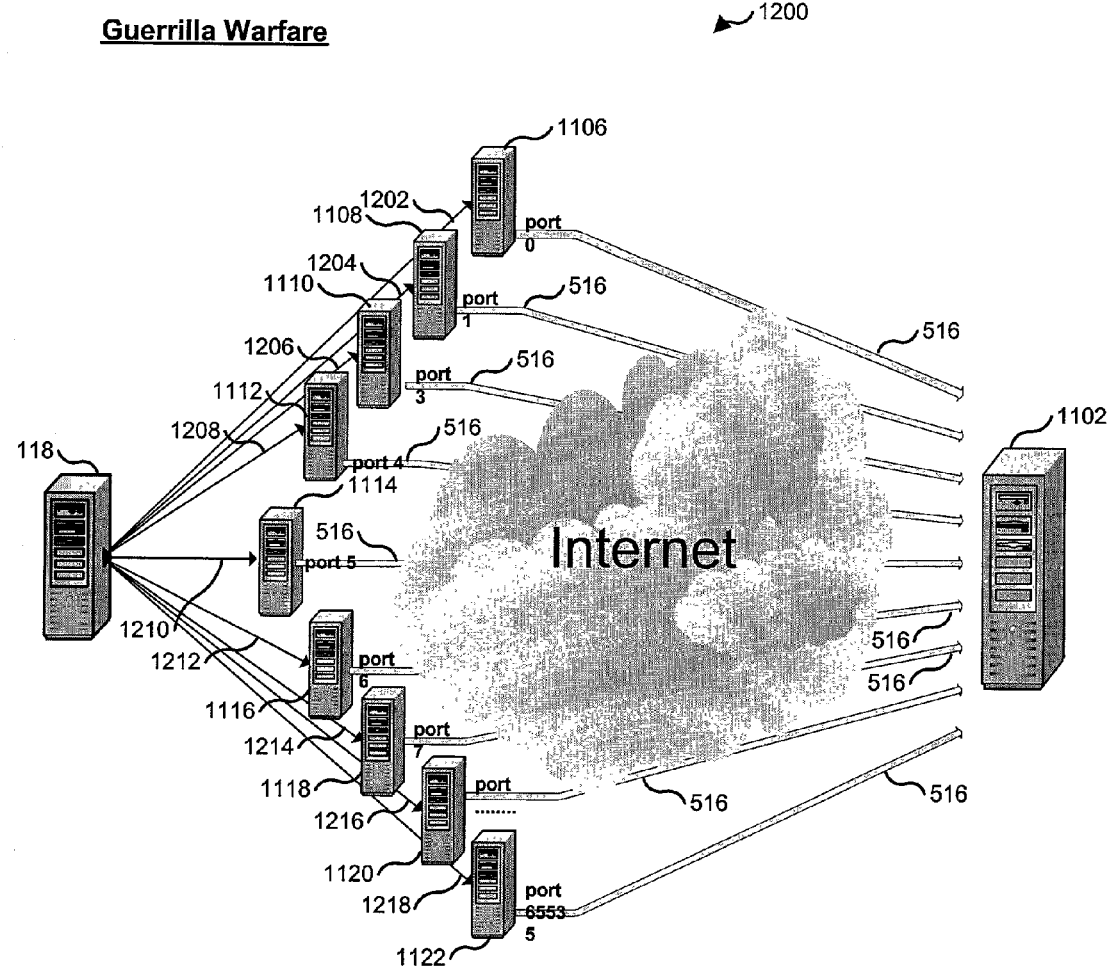
FIG. 12 depicts a diagram of a Guerrilla Warfare test, in accordance with a preferred embodiment of the present invention.

Depicted in overview 1200 of FIG. 12 is "Guerrilla Warfare." If Frontal Assault has been completed and a heightened level of security detected, a new methodology is needed for further probing of systems 1102 in the target network 1002. The Guerrilla Warfare method deploys randomness and other anti-IDS techniques to keep the target network defenses from identifying the activity. Many systems can detect a full Frontal Assault by pattern recognition.

However, when the methodology is changed to closely mimic the activities of independent random cyber attackers, many defensive systems do not notice the activity. Such attackers choose a single exploit and scan random addresses for that one problem. There are 131,070 ports for TCP & UDP per every computer 1102 on the network 1002 being analyzed. Port tests are be distributed across multiple Testers 502 to distribute the workload and to achieve the results in a practical period of time.

Other features of this methodology include additional anti-IDS methods. For instance, many sites deploy SSL (secure socket layers) on their web server so that when customers transmit sensitive information to the server it can be protected by a layer of encryption. The layer of encryption prevents a malicious eavesdropper from intercepting it. However, a preferred embodiment uses this same protective layer to hide the security testing of a web server from the network Intrusion Detection system.

Test instructions 1202 through 1218 are sent by Gateway 118 to Testers 1106 through 1122, respectively, generating appropriate tests 516 in accordance with the Guerrilla Warfare methodology.

Winds of Time

Figure 13:
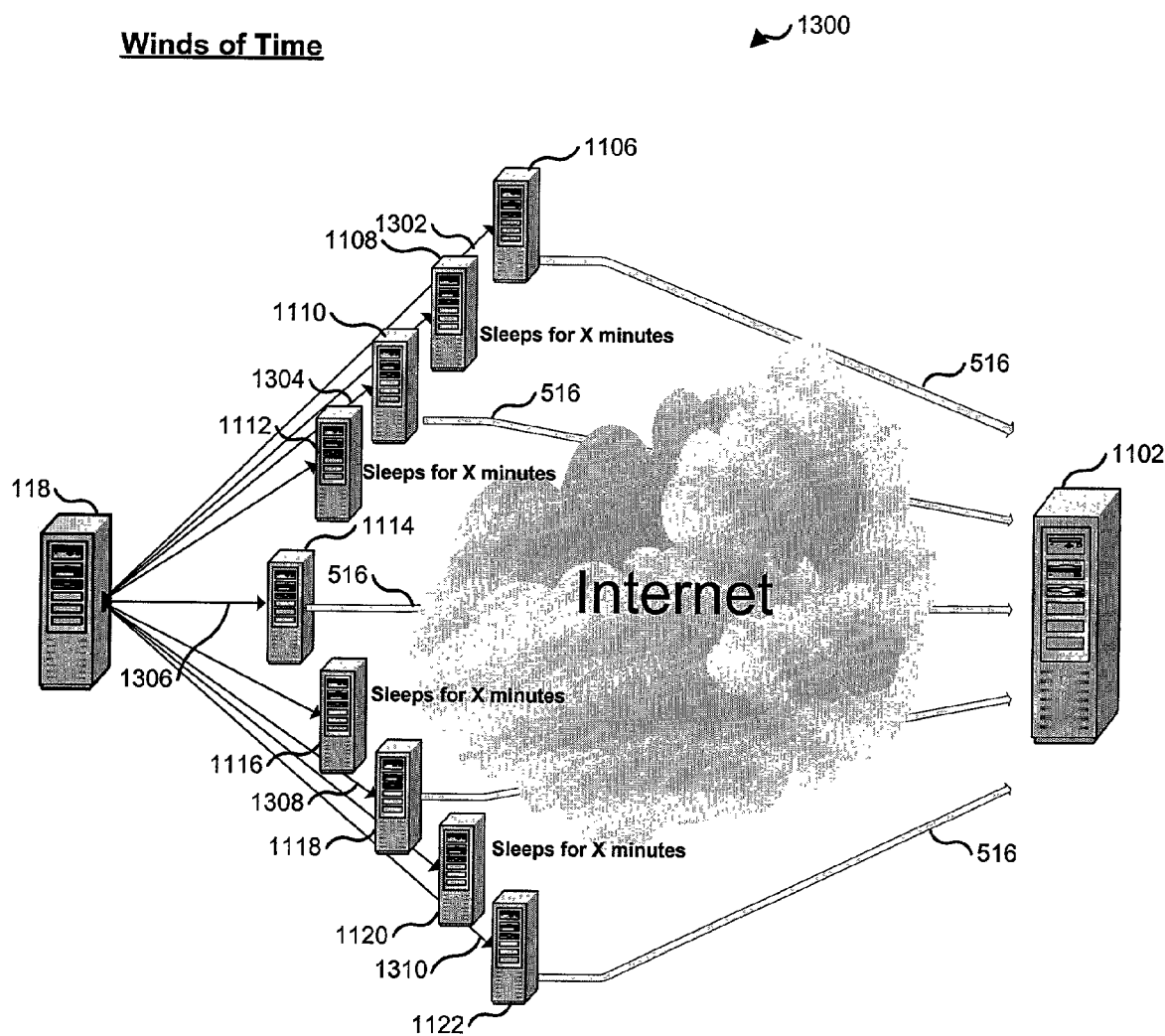
FIG. 13 depicts a diagram of a Winds of Time test, in accordance with a preferred embodiment of the present invention.

Depicted in overview 1300 in FIG. 13, the "Winds of Time" slows down the pace of an set of tests until it becomes much more difficult for a defensive mechanism sensitive to time periods to detect and protect against it. For example, a network defense can perceive a single source connecting to five ports within two minutes as an attack. Each Tester 502 conducts a basic test 516 and then waits for a period of time before performing another basic test 516 for that customer network 1002. Basic tests 516 for other customers who are not receiving the Winds of Time method can continue without interruption. Anti-IDS methods similar to those used in the Guerrilla Warfare methodology can be deployed, but their effectiveness is typically magnified when the element of time-delay is added. The Guerrilla and Wind of Time test methodologies can create unlimited test combinations.

Note that when a Tester (one of Testers 1106 through 1122) is said to "sleep for X minutes" in FIG. 13, the particular values for X do not need to be identical. For example, Tester 1108 will not test system 1102 for ten milliseconds, while Tester 1120 will not test system 1102 for five seconds. However, it should be noted that the sleeping Testers 1108, 1112, 1116, and 1120 can be testing other systems during this "sleep" time. Meanwhile, instructions 1302 through 1310 are sent from the Gateway 118 to the Testers 1106, 1110, 1114, 1118, and 1122 which are testing 516 system 1102.

Data Driven Logic

Figure 14:
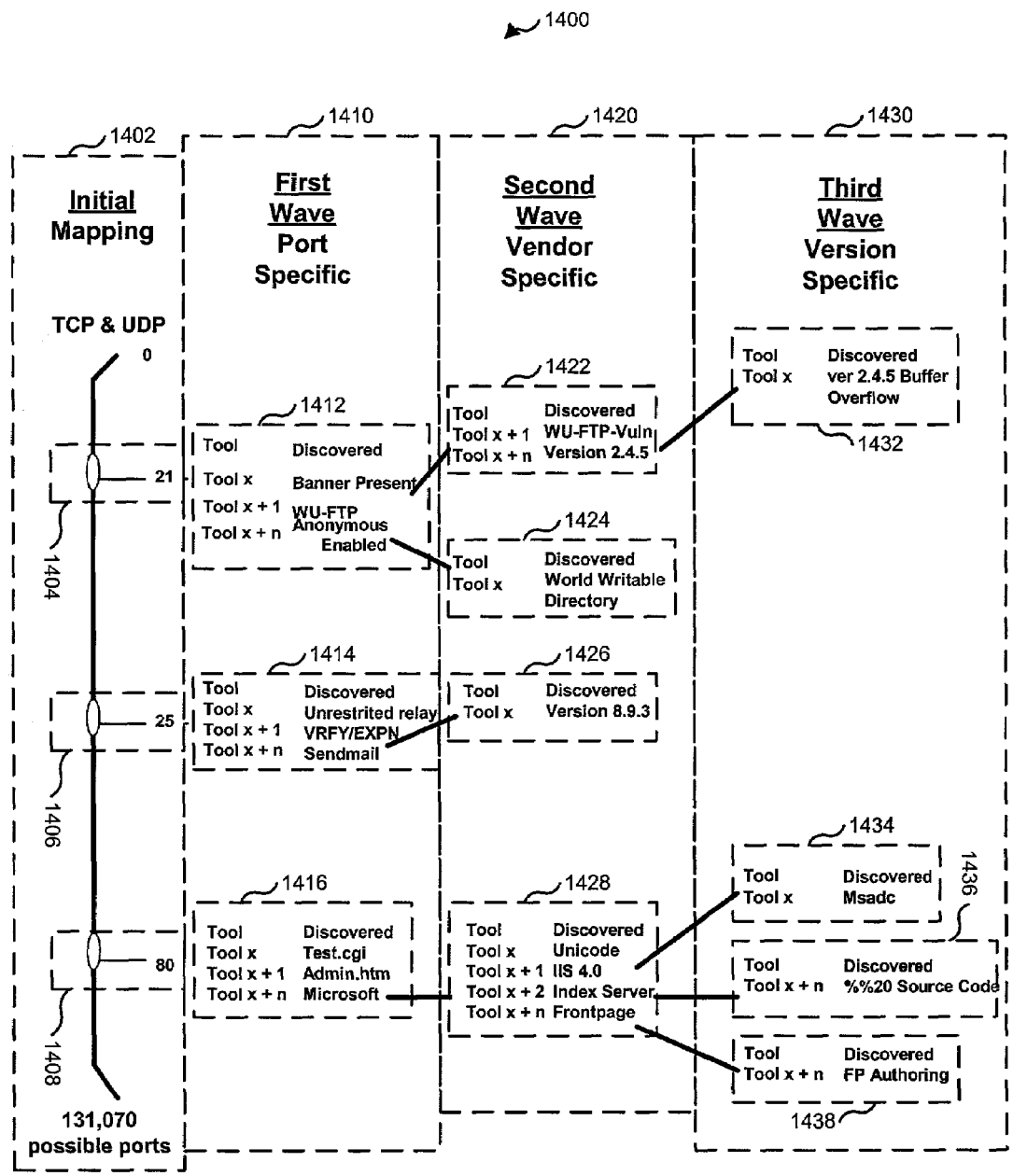
FIG. 14 depicts a flowchart illustrating dynamic logic in testing, in accordance with a preferred embodiment of the present invention.

Overview 1400 in FIG. 14 illustrates a sample of the attack logic used by a preferred embodiment. Prior to the first "wave" 1410 of basic tests 516, an initial mapping 1402 records a complete inventory of services running on the target network 1002. An initial mapping 1402 discloses what systems 1102 are present, what ports are open (1404, 1406, and 1408) what services each system is running, general networking problems, web or e-mail servers, whether the system's IP address is a phone number, etc. Basic network diagnostics might include whether a system can be pinged, whether a network connection fault exists, whether rerouting is successful, etc. For example, regarding ping, some networks have ping shut off at the router level, some at the firewall level, and some at the server level. If ping doesn't work, then attempt can be made to establish a handshake connection to see whether the system responds. If handshake doesn't work, then request confirmation from the system of receipt of a message that was never actually sent because some servers can thereby be caused to give a negative response. If that doesn't work, then send a message confirming reception of a message from the server that was not actually received because some servers can thereby be caused to give a negative response. Tactics like these can generate a significant amount of information about the customer's network of systems 1002.

Based on that information, found in the initial mapping, the first wave 1410 of tools can be prepared and executed to find general problems. Most services have general problems that affect all versions of that service regardless of the vendor. For example, ftp suffers from anonymous access 1412, e-mail suffers from unauthorized mail relaying 1414, web suffers from various sample scripts 1416, etc. In addition, the first wave 1410 of tools 514 attempts to collect additional information related to the specific vendor that programmed the service. The information collected from the first wave 1410 can be analyzed and used to prepare and execute the next wave of tools 514. The second wave 1420 looks for security holes that are be related to specific vendors (for example, 1422, 1424, 1426, and 1428). In addition to any vendor specific vulnerabilities that are discovered, the second wave attempts to obtain the specific version numbers of the inspected services. Based on the version number, additional tools 514 and tests 516 can be prepared and executed for the third wave 1430. The third wave 1430 returns additional information like 1432, 1434, 1436, and 1438.

Software Scanner Logic

Figure 15:
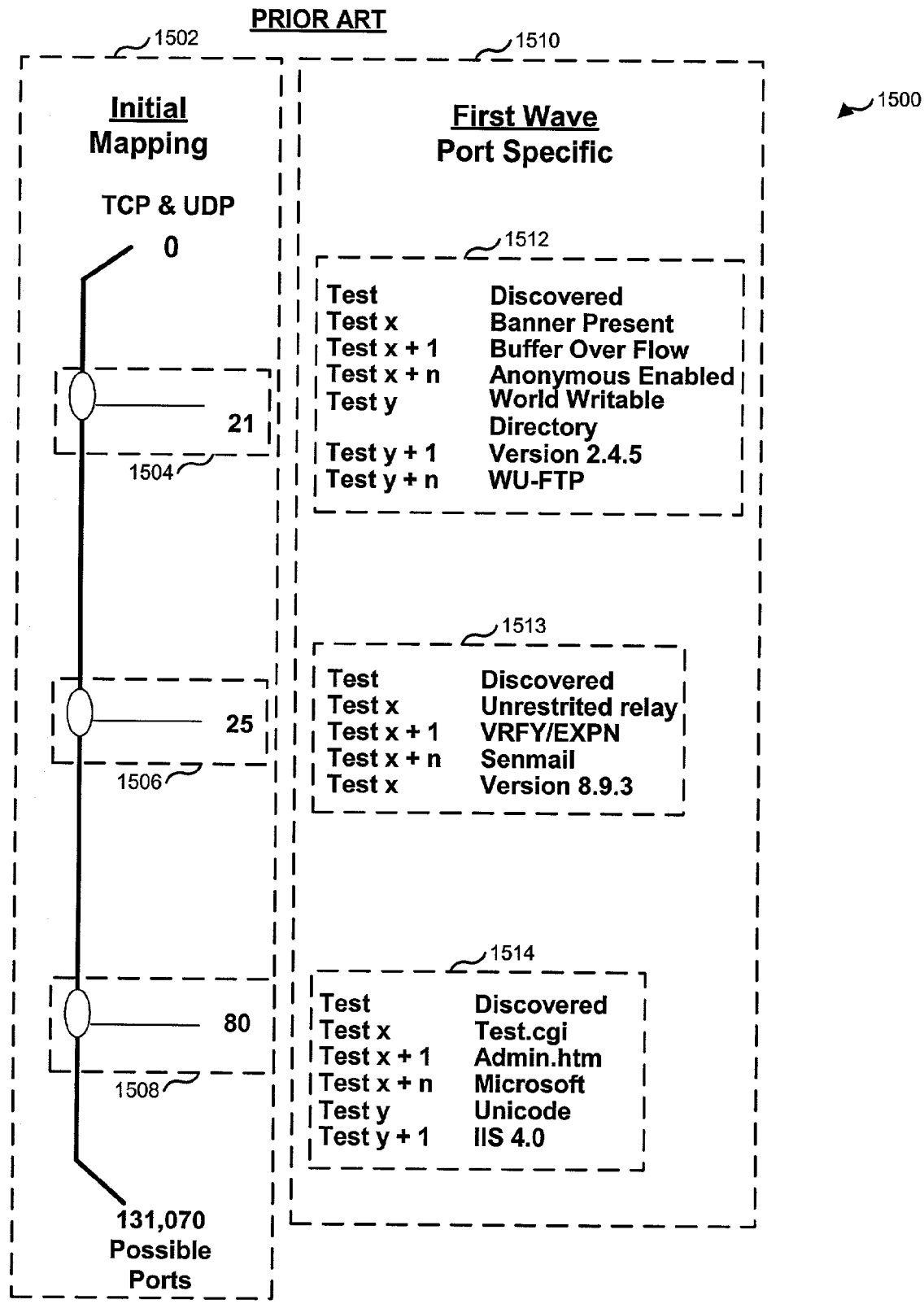
FIG. 15 depicts a flowchart illustrating one type of PRIOR ART logic in testing, in accordance with one embodiment of the PRIOR ART.

Depicted in overview 1500 of PRIOR ART FIG. 15 for comparison purposes, is the typical method of test that is found in vulnerability scanner software. It simply finds open service ports during an initial mapping 1502 and then executes all tests 516 pertaining to the "testing group" (for example, 1512, 1513, and 1514) in a first (and only) wave 1510. While it can gather similar vender/version information as it goes, it does not actually incorporate the information into the scan. This type of logic does not adapt its testing method to respond to the environment, making it prone to false positives. A false positive occurs when a vulnerability is said to exist based on testing results, when the vulnerability does not actually exist.

Figures 16A, 16B:
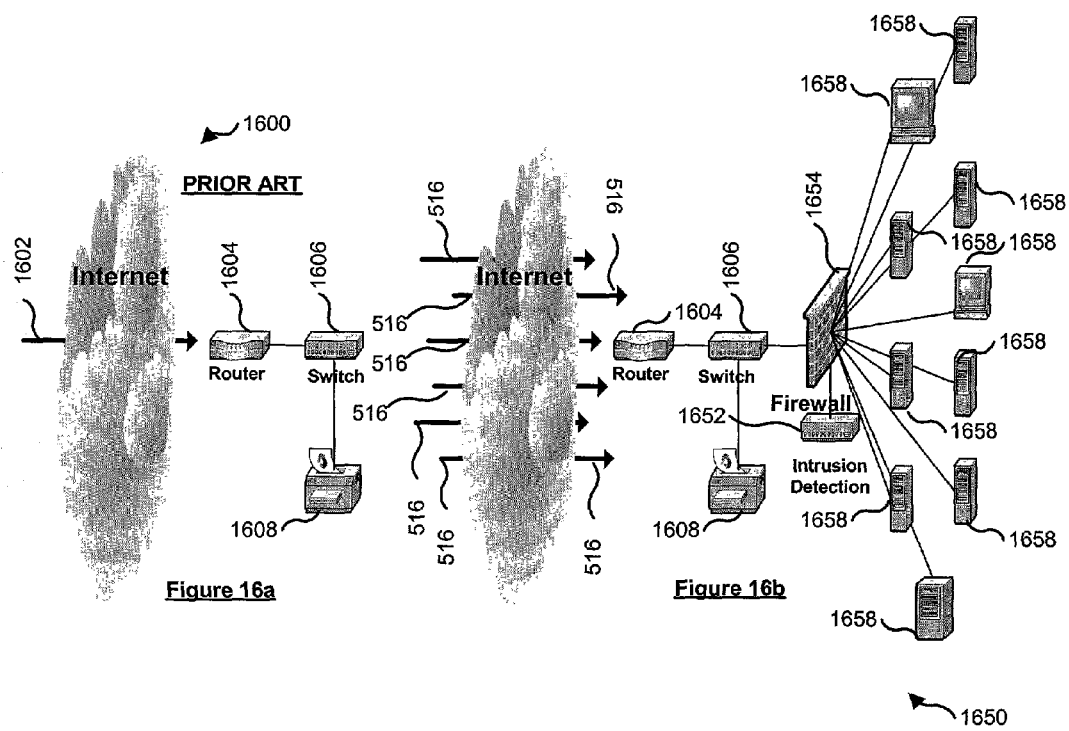
FIG. 16a depicts a diagram illustrating results from one method of PRIOR ART testing on a high security network, in accordance with one embodiment of the PRIOR ART.
FIG. 16b depicts a diagram illustrating results from using a preferred embodiment on a high security network, in accordance with a preferred embodiment of the present invention.
Figure 17:
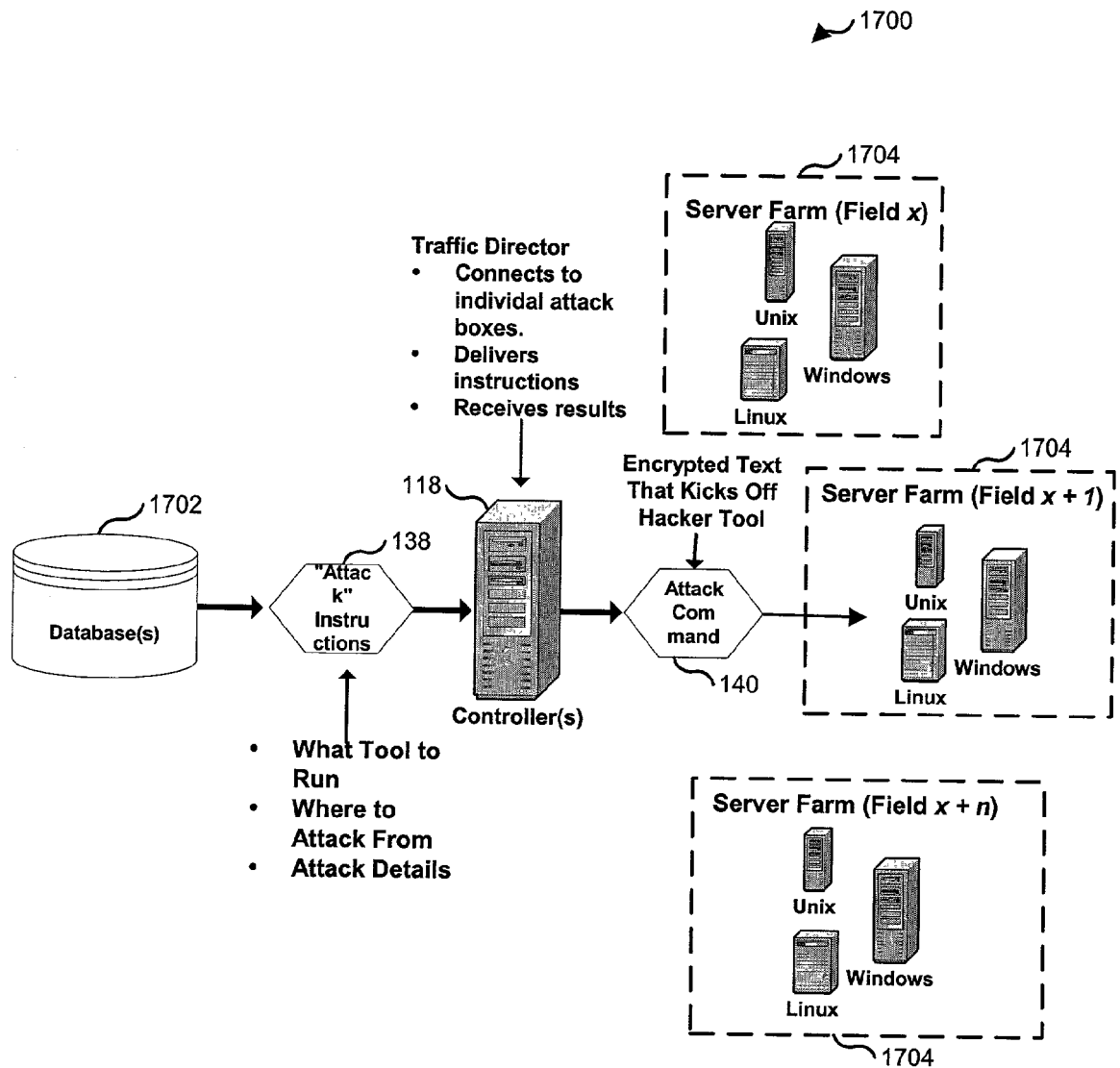
FIG. 17 depicts a diagram of an alternative preferred embodiment in which the functionalities of the database and command engine are performed by the same machine, in accordance with a preferred embodiment of the present invention.

Software scanners can be blocked at the point of customer defense, as shown for example, in FIG. 16a, in overview 1600 of PRIOR ART FIG. 16a, where test 1602 finds devices 1604, 1606, an 1608 only. A preferred embodiment, by contrast, can penetrate those defenses to accurately locate all devices reachable from the Internet, in the example shown in overview 1600 of FIG. 16b, where tests 516 find devices 1604, 1606, 1608, and also, beyond defenses 1652 and 1654, devices 1658.

Note that there is no reason why an alternative communication medium other than the Internet could not be used by a preferred embodiment. Such would not constitute a substantial variance.

Better Test Methodologies Provide Better Results

A preferred embodiment, through distributed basic tests 516, is able to accurately map all of the networks 1002 and systems 1102 that are reachable from the Internet. The same distributed basic test methodology, in conjunction with pre- and post-testing, 508 enables a preferred embodiment to continue to evade IDS in order to accurately locate security vulnerabilities accurately on every machine 1102.

FIGS. 16a and 16b illustrate some differences between the capabilities of some PRIOR ART software scanners and a preferred embodiment. Typically, the greater the security measures in place, the greater the difference between these capabilities. The customer network being analyzed in the illustrations can be based on an actual system tested with a preferred embodiment, the network having very strong security defenses in place. The PRIOR ART testing of FIG. 16a was able to locate only a small portion of the actual network. By contrast, FIG. 16b depicts the level of discovery a preferred embodiment was able to achieve regarding the same network under test.

Figure 23:
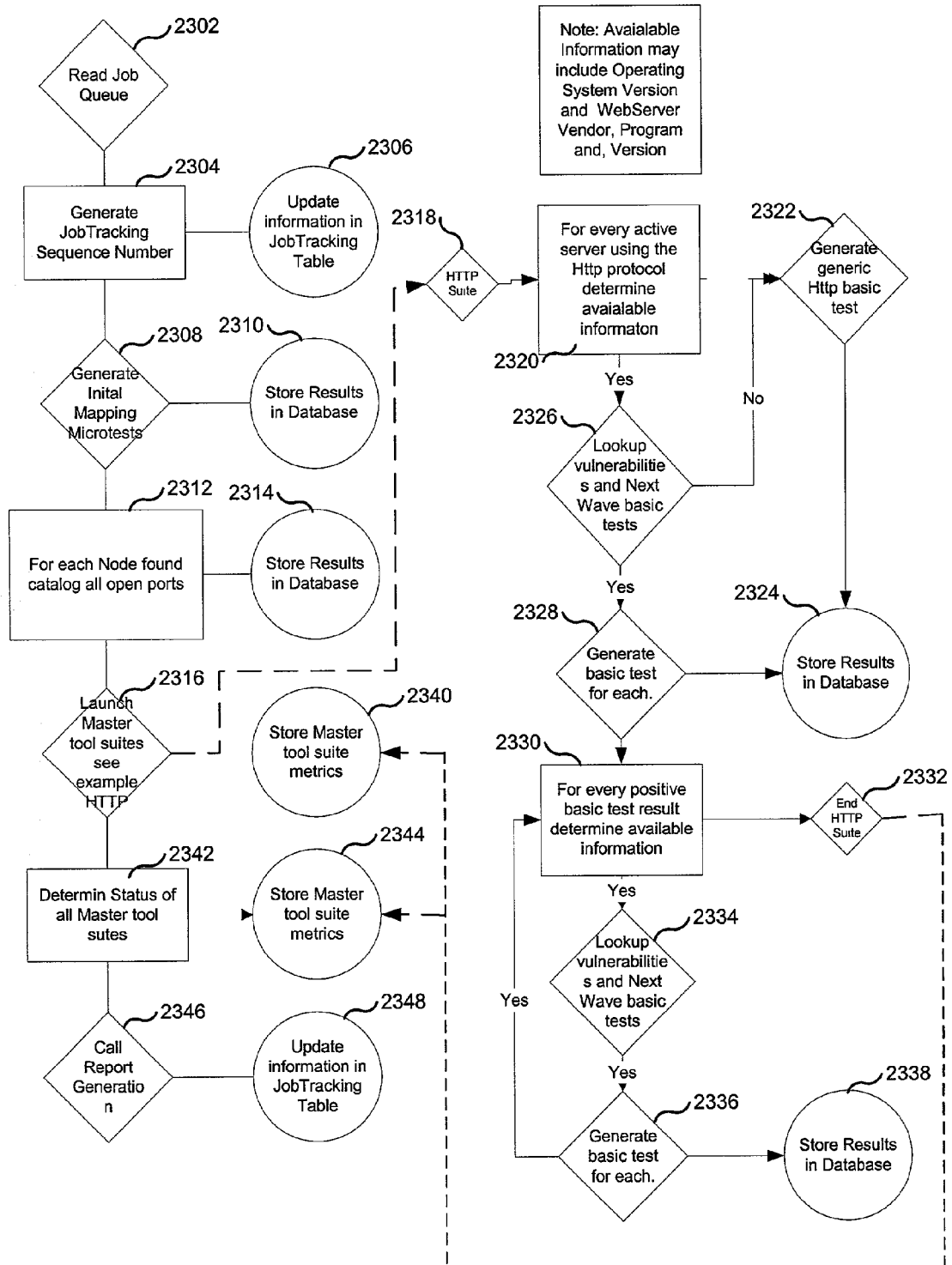
FIG. 23 depicts a flow chart of the testing process of a network vulnerability assessment system, in accordance with a preferred embodiment of the present invention.

FIG. 23 depicts logic flow within the Command Engine. First, the job cue is read, 2302; a job tracking sequence number is generated, 2304; information in the job tracking table is updated, 2306; and initial mapping basic tests are generated, 2308. The results of the initial mapping is stored in the Database, 2310. All open ports are catalogued for each node, 2312, and the results of that cataloguing is stored in the Database, 2314. Master tools are then simultaneously launched for all ports and protocols that need to be tested, 2312. The example illustrated shows only one tool suite needing to be launched, that being the HTTP protocol that was found on the open port. Block 2318 represents the launching of the HTTP suite. If the system under test has given no information about itself, then a generic HTTP test is generated, 2322, and the results are stored in the Database, 2324. However, if information is available about the systems under test at step 2320, then vulnerabilities are looked up and the next wave of basic tests planned accordingly, 2326. Basic tests are generated for each vulnerability, 2328, and results are stored in the Database from each basic test, 2324. Each basic test will either return a positive or negative result. For each positive result, determine whether information is available, 2330. Once all available information has been gathered, the http suite will end, 2332. So long as additional available information exists, vulnerabilities are looked up, and the next wave of basic tests, as appropriate, are generated based on that available information, 2334. Basic tests are generated for each vulnerability, 2336. The results of those basic tests are stored in the Database, 2338. Then the cycle repeats itself with a determination of whether available information still exists, 2330. After the master suite is finished, 2332, metrics are stored, 2340. The metrics might describe, for example, how long tools were operated, when the tools were executed, when they finished executing, etc. The status of all master tool suites is determined, 2342, and following the completion of all master tool suites, the reports are generated accordingly, 2346. The information in the job tracking table is then updated to indicate that the job has been completed and to store any other information that needs to be tracked, 2348.

Further Discussion of Testing Methodology

In a preferred embodiment, multiples waves of testing occur with each subsequent wave of tests including tests that are more finely grained. That is, each subsequent wave of tests includes tests that are more specifically focused on the system under test based on information obtained as in prior test results. Thereby, the testing methodology is more efficient than a brute force effort to blindly test every part of the system under test for every possible vulnerability, even though many vulnerabilities are logically eliminated from possibly being present by the results of earlier testing.

A preferred embodiment handles two types of testing difficulties. In the first case, testing may be impossible or hindered by physical or network connection difficulties. That is, tester communications fail to reach the system under test. In the second case, tester communications are able to physically reach the system under test, but a logic connection cannot be established. This is typically caused by recognition of the tester as a cyber attacker by an Intrusion Detection System (IDS). Failure at this point is failure to establish the session component of communicable coupling.

The first case is handled by switching to a different tester, perhaps using a different physical connectivity service provider. Successful establishment of a connection by the different tester would indicate a likelihood that the failed connectivity was due to a physical connectivity problem rather than IDS recognition.

The second case is handled by switching to a different IP address and attempting to test again. The different IP address may be on the same tester or a different tester. Successful establishment of a connection using the different IP address with the same tester would indicate a likelihood of IDS of the test from the first IP address.

In a preferred embodiment, testing occurs in successive waves, each wave generating additional information about the system under test, confirming the presence or likely presence of certain vulnerabilities and logically eliminating the possibility of other vulnerabilities. This process does not gather an infinite amount of information about the system under test. Rather, it gathers as much information as is possible based on the tools contained in the arsenal.

In a preferred embodiment, an initial mapping consists of a wave of a few tests of differing protocols directed to each IP address of the system under test. This efficiently determines with high likelihood the accessibility of IP addresses. For example, if a target IP address was tested previously and determined to be active, but in the current initial mapping it is completely unresponsive to a few tests of differing protocols, then that IP address is not tested further during the currently scheduled test. If a target IP address is found to be open, then subsequent testing waves could, for example, extensively test every port of the IP address.

Many preferred embodiments utilize a customer profile in improving the efficiency and effectiveness of testing. In a preferred embodiment, the pre-test customer profile contains customer information, IP addresses, test tool constraints, test methodology restraints, and connectivity bandwidth of connections. Note that in other embodiments, customer profiles could contain more or less information of an extremely wide scope, and that would not depart from the scope of the present invention.

In a preferred embodiment, tests are distributed among testers to optimize speed, connectivity, and cost considerations. Other embodiments have other decision rules, not necessarily distributing for optimization, and not necessarily having the same factors. Examples of distribution considerations include size of the system under test, load on testers from other sources besides tests for the system under test, connectivity performance, cost for bandwidth factors, geographic proximity, known obstacles, etc. Examples of known obstacles include openings given through system defenses, firewall/filter information already known, active IDS information already known, etc. Examples of cost factors include cost per bit, cost per transmission, etc. Examples of connectivity performance include absolute speed, reliability, etc.

Operation of a Preferred Embodiment

The following is a description of an example of one preferred embodiment's operation flow.

Security assessment tests for each customer can be scheduled on a daily, weekly, monthly, quarterly or annual basis. The Job Scheduling module 202 initiates customer tests, at scheduled times, on a continuous basis.

The Check Schedule module 302 in the Command Engine 116 polls the Job Scheduling module 202 to see if a new test needs to be conducted. If a new test job is available, the Check Schedule module 302 sends the customer profile 204 to the Test Logic module 304. The customer profile 204 informs the Command Engine 116 of the services the customer purchased, the IP addresses that need to be tested, etc. so that the Command Engine 116 can conduct the appropriate set of tests 516.

Based on the customer profile 204, the Test Logic module 304 determines which tests 516 needs to be run by the Testers 502 and where the tests 516 should come from. The Test Logic module 304 uses the customer profile 204 to assemble a list of specific tests 516; it uses the Resource Management module 308, which tracks the availability of resources, to assign the tests 516 to specific Testers 502. This list can be sent to the Tool Initiation Sequencer 312. The Tool Initiation Sequencer 312 works in conjunction with the Tool Management module 314 to complete the final instructions to be used by the Gateway 118 and the Testers 502. These final instructions, the instruction sequences, can be placed in the Queue 310.

The Gateway 118 retrieves 402 the instruction sequences from the Queue 310. Each instruction sequence consists of two parts. The first part contains instructions to the Gateway 118 and indicates which Tester 502 the Gateway 118 should communicate with. The second part of the instructions is relevant to the Tester 502, and it is these instructions that are sent to the appropriate Tester 502.

Each port on each system 1102 is typically tested to find out which ports are open. Typically, there are 65,535 TCP ports and 65,535 UDP ports for a total of 131,070 ports per machine. For example, one hundred thirty tests can be required to determine how many of the ports are open. Certain services are conventionally found on certain ports. For example, web servers are usually found on port 80. However, a web server may be found on port 81. By checking protocols on each possible port, a preferred embodiment would discover the web server on port 81.

Once the test 516 is completed by the Tester 502, the results are received by the Tool/Test Output module 306. This module sends the raw results 214 to the Database 114 for storage and sends a copy of the result to the Test Logic module 304. The Test Logic module 304 analyzes the initial test results and, based on the results received, determines the make-up of the next wave of basic tests 516 to be performed by the Testers 502. Again, the new list is processed by the Tool Initiation Sequencer 312 and placed in the Queue 310 to be retrieved by the Gateway 118. This dynamic iterative process repeats and adapts itself to the customer's security obstacles, system configuration and size. Each successive wave of basic tests 516 collects increasingly detailed information about the customer system 1102. The process ends when all relevant information has been collected about the customer system 1102.

As tests 516 are being conducted by the system, performance metrics 208 of each test are stored for later use.

The Resource Management module 308 helps the Test Logic 304 and the Tool Initiation modules 312 by tracking the availability of Testers 502 to conduct tests 516, the tools 514 in use on the Testers 502, the multiple tests 516 being conducted for a single customer network 1002 and the tests conducted for multiple customer networks 1002 at the same time. This can represent hundreds of thousands of basic tests 516 from multiple geographical locations for one customer network 1002 or several millions of basic tests 516 conducted at the same time if multiple customer networks 1002 are being tested simultaneously.

The Gateway 118 is the "traffic director" that passes the particular basic test instructions from the Command Engine Queue 310 to the appropriate Tester 502. Each part of a test 516 can be passed as a separate command to the Tester 516 using the instructions generated by the Tool Initiation Sequencer 312. Before sending the test instructions to the Testers 502, the Gateway 118 verifies that the Tester's 502 resources are available to be used for the current test 516. Different parts of an entire test can be conducted by multiple Testers 502 to randomize the points of origin. This type of security vulnerability assessment is typically hard to detect, appears realistic to the security system, and may reduce the likelihood of the customer security system discovering that it is being penetrated. Multiple tests 516, for multiple customer systems 1102 or a single customer system 1102, can be run by one Tester 502 simultaneously. Typically, all communication between the Gateway 118 and the Testers 502 is encrypted. As the results of the tests 516 are received by the Gateway 118 from the Testers 502 they are passed to the Command Engine 116.

The Testers 502 house the arsenals of tools 514 that can conduct hundreds of thousands of hacker and security tests 516. The Tester 502 receives from the Gateway 118, via the Internet, encrypted basic test instructions. The instructions inform the Tester 502 which test 516 to run, how to run it, what to collect from the customer system, etc. Every basic test 516 is an autonomous entity that is responsible for only one piece of the entire test that can be conducted by multiple Testers 502 in multiple waves from multiple locations. Each Tester 502 can have many basic tests 516 in operation simultaneously. The information collected in connection with each test 516 about the customer systems 1102 in customer network 1002 is sent to the Gateway 118.

The API 512 is a standardized shell that holds any code that is unique to the tool (such as parsing instructions), and thus APIs commonly vary among different tools.

Report Generator Subsystem Functionality

The Report Generator 110 uses the information collected in the Database 114 about the customer's systems 1002 to generate a report 2230 about the systems profile, ports utilization, security vulnerabilities, etc. The reports 2230 reflect the profile of security services and reports frequency the customer bought. Security trend analyses can be provided since the scan stores customer security information on a periodic basis. The security vulnerability assessment test can be provided on a monthly, weekly, daily, or other periodic or aperiodic basis specified and the report can be provided in hard copy, electronic mail or on a CD.

Figure 22:
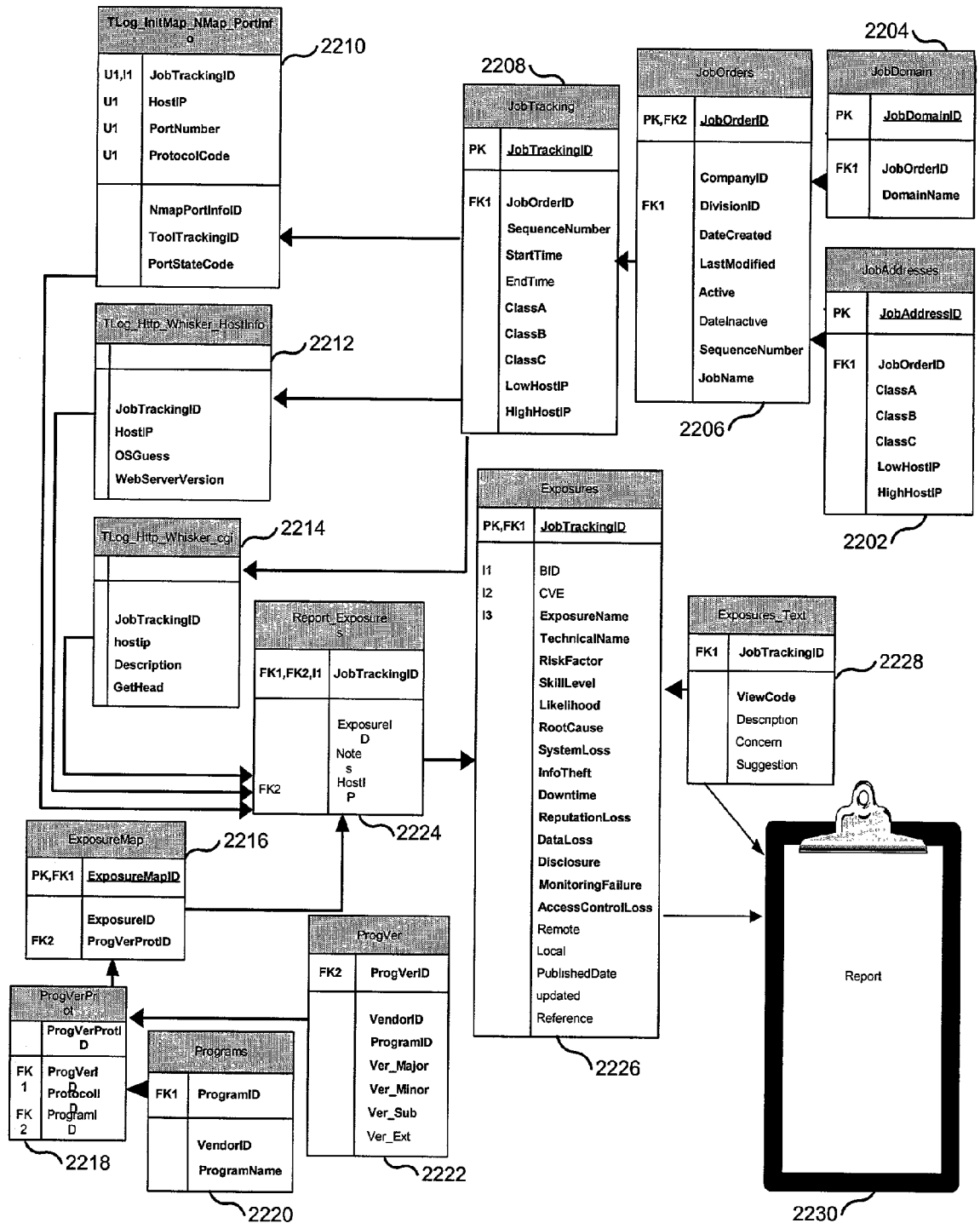
FIG. 22 depicts a flow chart of information within a database component of a network vulnerability assessment system, in accordance with a preferred embodiment of the present invention.

FIG. 22 depicts the logic flow at a high level of information flowing through a preferred embodiment during its operation. The domain or URL and IP addresses of the system to be tested are provided in Table 2202 and 2204 combining to make up a job order shown as Table 2206. Job tracking occurs as described elsewhere in the specification represented by Table 2208. Tables 2210, 2212, and 2214 depict tools being used to test the system under test. Information is provided from those tools following each test and accumulated as represented in Table 2224 in the Database 114. Additional information about vulnerabilities is gathered from other sources other than through test results as represented by Tables 2222, 2220, 2218 and 2216, which is also fed into Table 2224. Therefore, Table 2224 should contain information on the vulnerabilities mapped to the IP addresses for that particular job. Tables 2226 and 2228 represent the vulnerability library, and information goes from there to create Report 2230.

Future reports/reporting capabilities might include, survey details such as additional information that focuses on the results of the initial mapping giving in depth information on the availability and the types of communication available to machines that are accessible from the Internet; additional vulnerability classifications and breakdowns by those classifications; graphical maps of the network; new devices since the previous assessment; differences between assessments: both what is new and what has been fixed since the previous assessment; IT management reports, such as who has been assigned the vulnerability to fix, who fixed the vulnerability, how long has the vulnerability been open and open vulnerabilities by assignment, and breakdown of effectiveness of personal at resolving security issues.

Early Warning Generator Subsystem Functionality

The Early Warning Generator subsystem 112 can be used to alert relevant customers on a daily basis of new security vulnerability that can affect their system 1102 or network 1002. On a daily basis, when new security vulnerabilities can be provided, a preferred embodiment compares 710 the new vulnerability 702 against the customer's most recent network configuration profile 708. If the new vulnerability 702 can be found to affect the customer systems 1102 or network 1002 then an alert 714 is sent via e-mail 712 to the customer. The alert 714 indicates the detail of the new vulnerability 702, which machines are affected, and what to do to correct the problem. Only customers affected by the new security vulnerabilities 702 receive the alerts 714.

Figure 18:
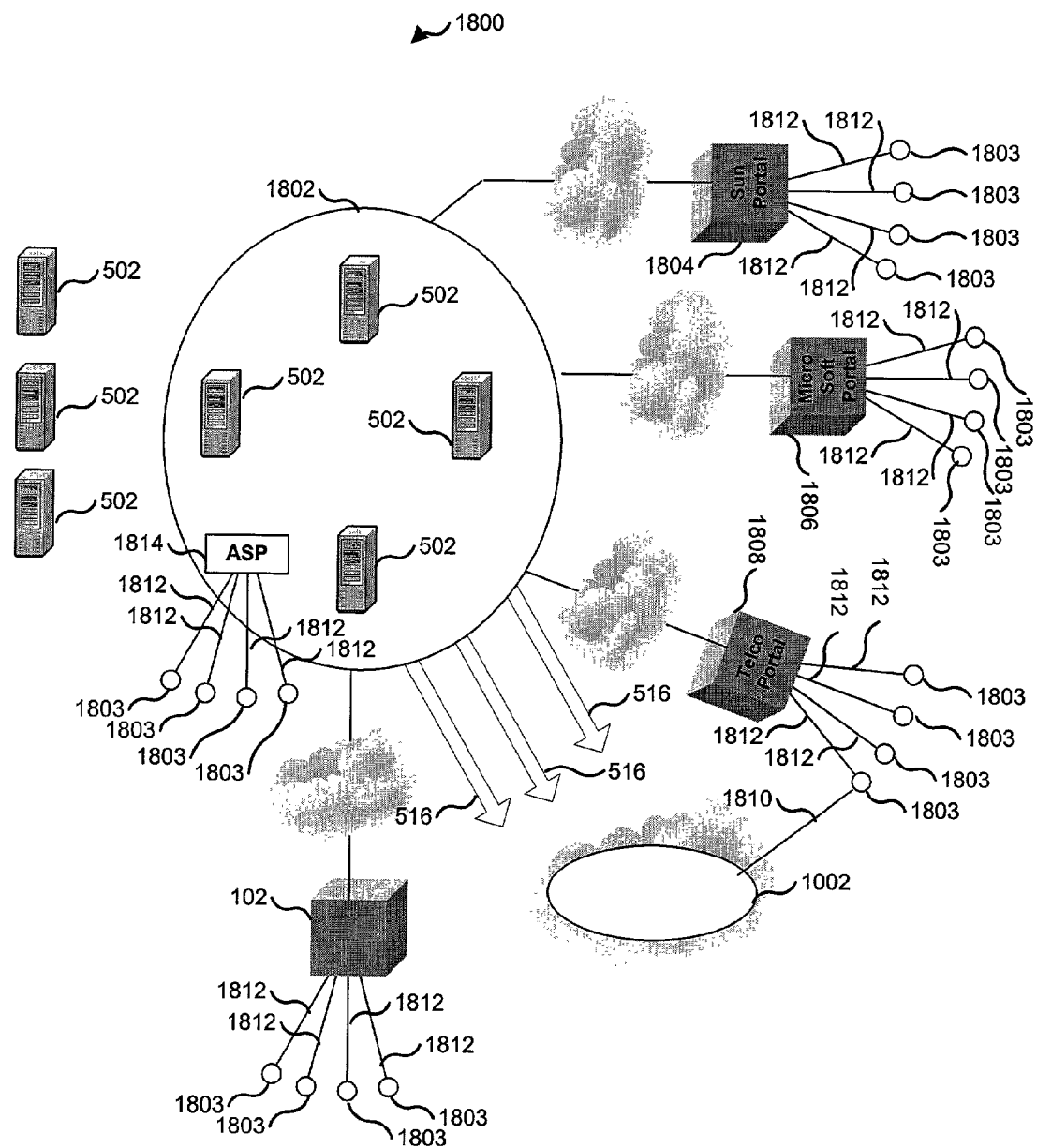
FIG. 18 depicts a diagram of an alternative preferred embodiment in which requests for testing pass through third party portals, in accordance with a preferred embodiment of the present invention.

FIG. 18 shows an alternative preferred embodiment in which third-party portals 1804, 1806, and 1808, for example, access the services of the system. Tester 502 contained within logical partition 1802 have been selected to provide services accessible via portals 1804, 1806, and 1808. Tester's 502 outside of logical partition 1802 have not been selected to provide such services. ASP 1814 has been connected as part of the logical system 1802 in order to provide services directly from the set of Tester's 502 contained within logical system 1802. The Tester's 502 contained within logical system 1802 is driven by Test Center 102. Requests for testing services are initiated from customer node 1803 through communication connection 1812. Requests for services can be initiated directly from a customer node 1803 to Test Center 102; or through a third-party portal, such as one of portals 1804, 1806 or 1808; or directly to a linked ASP 1814. The communication link from any particular customer node 1803 is shown by communication link 1812 and can be any communication technology, such as DSL, cable modem, etc. The ASP is linked to logical system 1802 by using logical system 1802 to host itself to deliver services directly to its customers. In response to service requests, Tester's 502 within logical system 1802 are used to deliver tests 516 on the designated IP addresses which make up customer network 1002. Customer network 1002 can or cannot be connected to the requesting customer node 1803 via possible communication link 1810. Note that logical system 1802 can alternatively include all Tester's 502.

Figure 19:
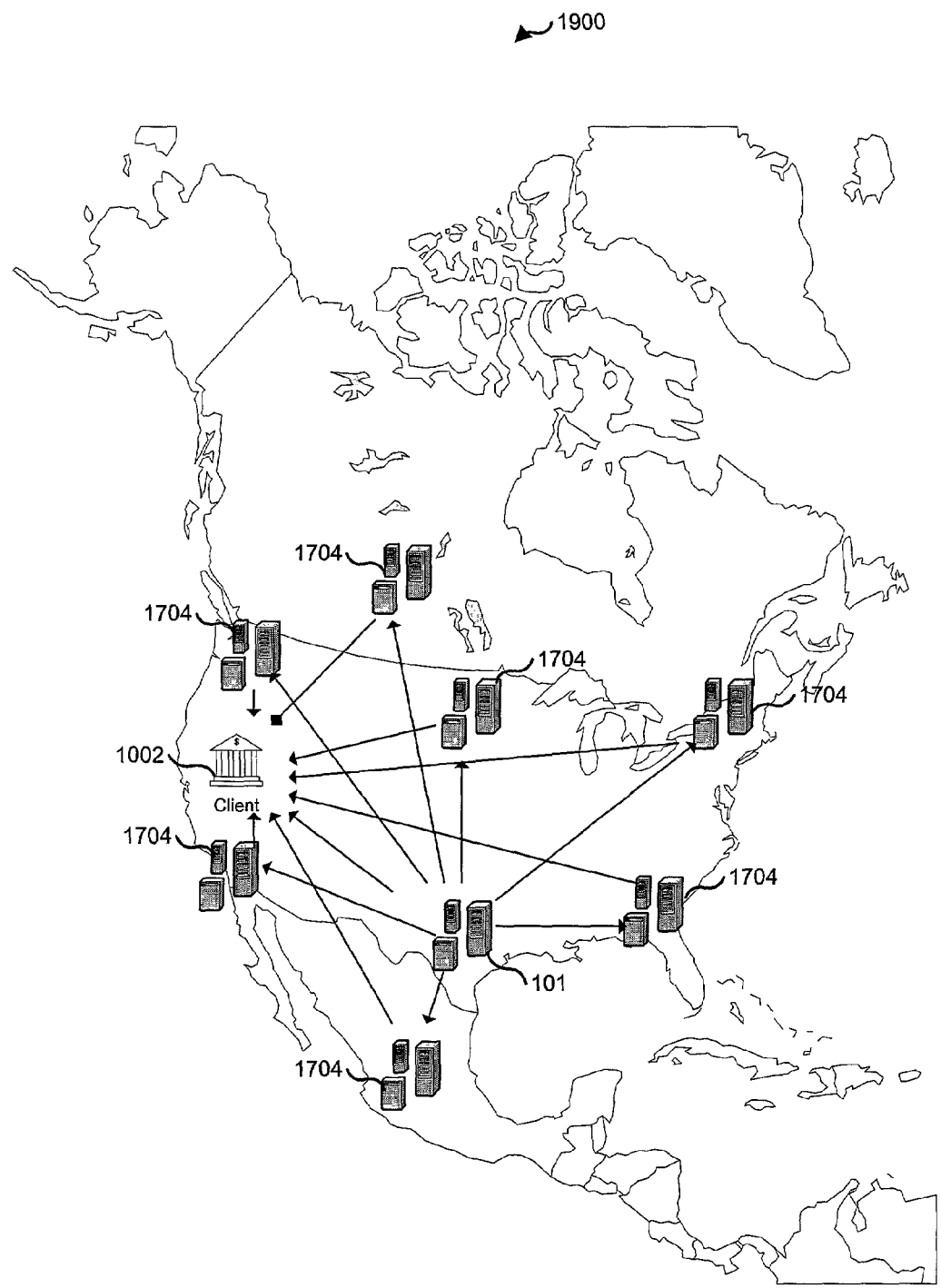
FIG. 19 depicts a diagram of a geographic overview of a network vulnerability assessment system testing target system with tests originating from different geographic locations in North America, in accordance with a preferred embodiment of the present invention.
Figure 20:
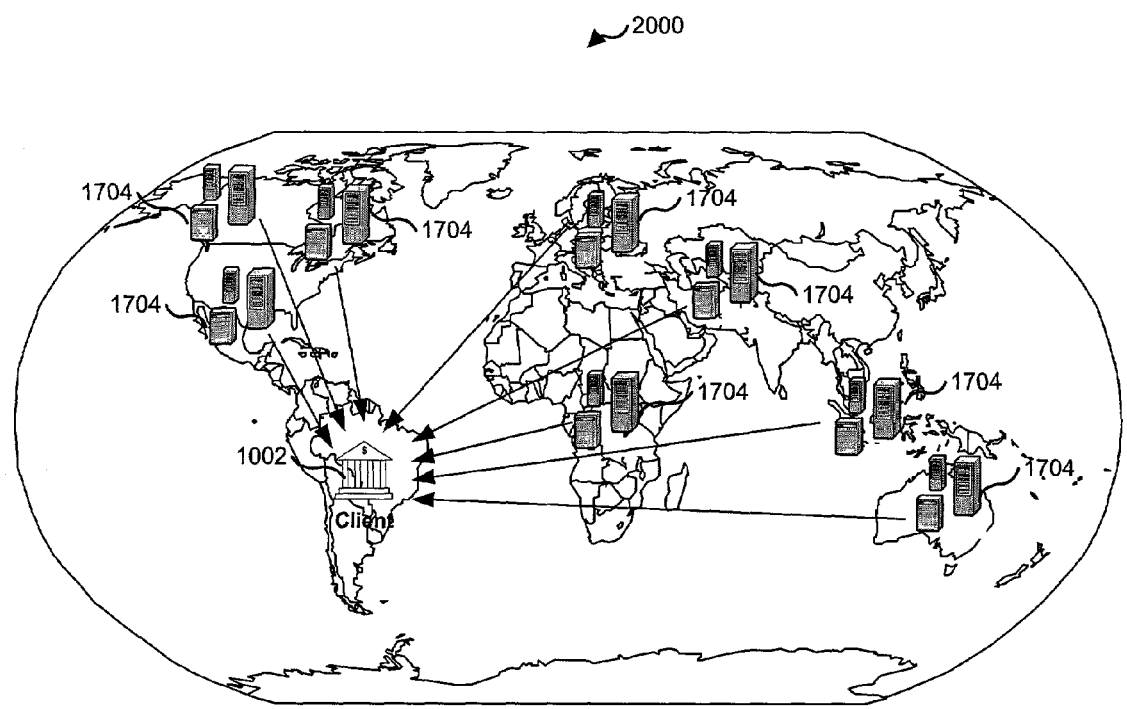
FIG. 20 depicts a diagram of a geographic overview of a network vulnerability assessment system testing target system with tests originating from different geographic locations world-wide, in accordance with a preferred embodiment of the present invention.

Geographic overview diagram 1900 in FIG. 19 depicts a geographically disbursed array of server farms 1704 conducting tests on client network 1002 as orchestrated by Test Center 101. Similarly, geographic overview 2000 in FIG. 20 shows the testing of customer network 1002 by a geographically disbursed array of Tester farms 1704.

Communications described as being transmitted via the Internet may be transmitted, in the alternative, via any equivalent transmission technology. Also, there is no reason why the functionalities of the Test Center 101 cannot be combined into a single computing device. Similarly, there is no reason why the functionalities of Test Center 102 cannot be combined into a single computing device. Such combinations, or partial combinations in the same spirit are within the scope of the invention and would not be substantially different from a preferred embodiments. Similarly, in most discussions of exemplary embodiments discussed in this specification, Test Center 101 and Test Center 102 would be interchangeable without affecting the spirit of the embodiment being discussed. A notable exception, for example, would be the discussion of updating tools 514, in which Test Center 101 is appropriately used because of the need for the functionality of RMCTs 119. Reports are described in this specification as being in any of a variety of formats. Additional possible formats include .doc, .pdf, html, postscript, .xml, test, hardbound, CD, flash, or any other format for communicating information.

It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. In particular, none of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Thus, it is intended that the following claims be interpreted to embrace all such further modifications, changes, rearrangements, substitutions, alternatives, design choices, and embodiments. Moreover, none of these claims are intended to invoke paragraph six of 35 U.S.C. §112 unless a phrase of the particular style "means . . . for" is followed by a participle.

What is claimed is:

1. A network security testing apparatus comprising:
   at least one first tester for generating a security vulnerability attack simulation comprised of a plurality of waves of tests for iteratively testing for network security vulnerabilities of a network system under test, the at least one first tester is adapted to communicably couple to the network system under test, said at least one first tester adapted to iteratively perform a plurality of waves of tests on the system under test to obtain network security vulnerability information;
   wherein each test in the plurality of waves of tests are adapted to return the network security vulnerability information regarding the network system under test, the network security vulnerability information provided by each test in the plurality of waves of tests being more specific to the network system under test than the network security vulnerability information provided by a previous test;
   wherein each test in the plurality of waves of tests are specifically modified in real-time to adapt to discovered security obstacles of the network system under test detected based on the network security vulnerability information gained from the previous test and to obtain additional network security vulnerability information from the network system under test.

2. The network security testing apparatus of claim 1, wherein each of the plurality of iterative tests are more specifically configured to adapt to system configuration of the network system under test based on the network security vulnerability information gained from the previous test and obtain the additional network security vulnerability information from the network system under test.

3. The network security testing apparatus of claim 1, wherein the network security vulnerability information includes information regarding network connectivity from the at least one first tester to the network system under test.

4. The network security testing apparatus of claim 1, wherein the network security vulnerability information includes connection information relating to an IP address used in the previous test.

5. The network security testing apparatus of claim 1, further comprising:
   at least one second tester that is adapted to communicably couple to the network system under test;
   wherein the previous test is executed by said at least one first tester;
   wherein determination of whether a subsequent test is executed by said at least one first tester or by said at least one second tester is made based at least partially upon the network security vulnerability information obtained by the previous test in order to adapt to the discovered security obstacles of the network under test.

6. The network security testing apparatus of claim 5, wherein the subsequent test includes execution of a test tool selected from a plurality of test tools based at least partially upon the network security vulnerability information obtained by the previous test.

7. The network security testing apparatus of claim 5, wherein the subsequent test includes execution of a test tool selected from a plurality of test tools based at least partially upon the system environment information.

8. The network security testing apparatus of claim 1, wherein the plurality of tests continue until all relevant information about the system under test has been collected.

9. A network security testing method comprising:
   a) executing a first wave of tests in a security vulnerability attack simulation by at least one first tester to test for network security vulnerabilities of a network system under test, wherein the first wave of tests is targeted at the network system under test, and wherein the at least one first tester is communicably coupled to the network system under test;
   b) receiving first information from the first wave of tests about the network system under test, after executing the first wave of tests, the first information comprising network security vulnerability information;
   c) executing a second wave of tests in a security vulnerability attack simulation to test for the network vulnerabilities of the network system under test after said receiving first information, wherein the second wave of tests is specifically modified in real time to adapt to discovered security obstacles of the network system under test detected based on the network security vulnerability information gained from the first wave of tests and obtain additional network security vulnerability information from the network system under test based on the first information, the additional network security vulnerability information is more specific to the network system under test than the first information;
   d) receiving the additional network security vulnerability information from the second wave of tests about the network system under test, after executing the second wave of tests;
   e) repeating steps a)-d) a plurality of times until relevant information about the system under test has been collected; and
   f) wherein the network security vulnerability information obtained from each subsequent wave of tests is more specific to the system under test based on the network security vulnerability information provided by each previous test.

10. The network security testing method of claim 9, wherein the time period between said executing the first wave of tests and said executing the second wave of tests can be negligible.

11. The network security testing method of claim 9, wherein said network security vulnerability information comprises information regarding network connectivity from the first tester to the network system under test.

12. The network security testing method of claim 9, wherein said receiving network security vulnerability information comprises receiving connection information relating to an IP address used in said executing the first test.

13. The network security testing method of claim 9, further comprising determining whether a test in the second wave of tests will be executed by the at least one first tester or by at least one second tester based upon the network security vulnerability information from the first test, before said executing the second test.

14. The network security testing method of claim 13, further comprising selecting the test in the second wave of tests from a plurality of tests based at least partially upon the network security vulnerability information.

15. The network security testing method of claim 9, further comprising selecting the test it the second wave of tests from a plurality of tests based at least partially upon the network security vulnerability information.

16. The network security testing method of claim 9, further comprising:
   determining whether all possible network security vulnerability information regarding the system under test has been received in light of the plurality of tests; and
   executing additional tests until all possible network security vulnerability information regarding the system under test has been received in light of the plurality of tests.

17. A computer program product for network security testing stored in a computer-readable medium, comprising:
   a) instructions for executing a first wave of tests in a security vulnerability attack simulation by at least one first tester to test for network security vulnerabilities of a network system under test, wherein the first wave of tests is targeted at the network system under test, and wherein the at least one first tester is communicably coupled to the network system under test;
   b) instructions for receiving first information from the first wave of tests about the network system under test, after executing the first wave of tests, the first information comprising network security vulnerability information;
   c) instructions for executing a second wave of tests to test for the network security vulnerabilities of the network system undet test after said receiving first information, wherein the second wave of tests is specifically modified in real time to adapt to the discovered security obstacles of the network system under test detected based on the network security vulnerability information gained from the first wave of tests and obtain additional network security vulnerability information from to the network system under test based on the first information, the additional network security vulnerability information is more specific to the network system under test than the first information;

d) instructions for receiving the additional network security vulnerability information from the second wave of tests about the network system under test, after executing the second wave of tests;

e) instructions for repeating steps a)-d) a plurality of times until all relevant information about the system under test has been collected; and f) instructions for wherein the network security vulnerability information obtained from each subsequent wave of tests is more specific to the system under test based on the network security vulnerability information provided by each previous test.

18. The computer program product of claim 17, wherein the time period between executing the first wave of tests and executing the second wave of tests can be negligible.

19. The computer program product of claim 17, wherein said network security vulnerability information comprises information regarding network connectivity from the at least one first tester to the network system under test.

20. The computer program product of claim 17, wherein receiving network security vulnerability information comprises receiving session establishability information relating to an IP address used in executing the first test.

21. The computer program product of claim 17, further comprising instructions for determining whether a test in the second wave of tests will be executed by the at least one first tester or by at least one second tester based upon the network security vulnerability information from the first test, before said executing the second test.

22. The computer program product of claim 21, further comprising instructions for selecting the test in the second wave of tests from a plurality of tests based at least partially upon the network security vulnerability information.

23. The computer program product of claim 17, further comprising instructions for selecting the test in the second wave of tests from a plurality of tests based at least partially upon the network secutity vulnerability information.

24. The computer program product of claim 17, further comprising:

instructions for determining whether all possible network security vulnerability information regarding the system under test has been received in light of the plurality of tests; and instructions for executing additional tests until all possible network security vulnerability information regarding the system under test has been received in light of the plurality of tests.

25. A network security testing apparatus comprising:

a plurality of testers for generating a security vulnerability attack simulation comprised of a plurality of waves of tests for iteratively testing for network security vulnerabilities of a network system under test to obtain network security vulnerability information;

wherein each of said plurality of testers is adapted to communicably couple to the network system under test;

wherein a test of the network system under test is performed by a selected tester of said plurality of testers, said selection of said selected tester to adapt in real time to discovered security obstacles of the network system wider test based on the network security vulnerability information gained from a previous test to obtain more specific network security vulnerability information from the network system under test;

wherein said plurality of testers has a load balance characteristic describing a degree of balance of loads of testers of said plurality of testers; and wherein the selected tester is selected from said plurality of testers based additionally on optimizing the load balance characteristic.

26. The network security testing apparatus of claim 25, wherein each tester of said plurality of testers has at least one quality of communicable coupling to the system under test; and wherein the selected tester is selected from said plurality of testers based at least partially on the selected tester's quality of communicable coupling.

27. The network security testing apparatus of claim 26, wherein the quality of communicable coupling includes:

cost per bit;

absolute speed; and geographical proximity of the selected tester to the system under test.

28. A network security testing method comprising:

selecting at least one tester from a plurality of testers for generating a security vulnerability attack simulation comprised of a plurality of waves of tests for iteratively testing for network security vulnerabilities of a network system under test to obtain network security vulnerability information, said selection of said at least one tester to adapt in real time is modified to discovered security obstacles of the network system under test detected based on network security vulnerability information gained from a previous test to obtain more specific network security vulnerability information from network system under test;

executing a test by the selected tester, wherein the test is targeted at a the network system under test, and wherein the selected tester is communicably coupled to the network system under test;

wherein the plurality of testers has a load balance characteristic describing a degree of balance of loads of testers of the plurality of testers; and wherein said selecting a selected tester from a plurality of testers is further based at least partially on optimizing the load balance characteristic.

29. The network security testing method of claim 28, wherein each tester of the plurality of testers has at least one quality of communicable coupling to the network system under test; and wherein said selecting a selected tester from a plurality of testers is further based at least partially on the selected tester's quality of communicable coupling.

30. The network security testing method of claim 29, wherein the quality of communicable coupling includes:

cost per bit;

absolute speed; and geographical proximity of the selected tester to the system under test.

31. A computer program product for network security testing stored in a computer-readable medium, comprising:

instructions for at least one selected tester from a plurality of testers for generating a security vulnerability attack simulation comprised of a plurality of waves of tests for iteratively testing for network security vulnerabilities of a network system under test to obtain network security vulnerability information, said selection of said at least one tester to adapt in real time is modified to discover security obstacles of the network system under test detected based on network security vulnerability information gained from a previous test to obtain more specific network security vulnerability information from network system under test;

instructions for executing a test by the selected tester, wherein the test is targeted at a system tinder test, and wherein the selected tester is communicably coupled to the network system under test;

wherein the plurality of testers has a load balance characteristic describing a degree of balance of loads of testers of the plurality of testers; and wherein the selecting a selected tester from a plurality of testers is further based at least partially on optimizing the load balance characteristic.

32. The computer program product of claim 31, wherein each tester of the plurality of testers has at least one quality of communicable coupling to the system under test; and wherein the selecting a selected tester from a plurality of testers is further based at least partially on the selected tester's quality of communicable coupling.

33. The computer program product of claim 32, wherein the quality of communicable coupling includes:

cost per bit;

absolute speed; and geographical proximity of the selected tester to the system under test.

34. A network security testing apparatus comprising:

at least one first tester that is adapted to communicably couple to a network system under test to generate a security vulnerability attack simulation comprised of a plurality of waves of tests to perform network security vulnerability testing, wherein said at least one first tester is adapted to iteratively perform a plurality of waves of tests on the network system under test to obtain network security vulnerability information on the network system under test;

wherein each test in the plurality of waves of tests are specifically modified in real-time to adapt to discovered security obstacles of the network system under test detected based on the network security vulnerability information gained from the previous test and to obtain additional network security vulnerability information from the network system under test;

wherein said at least one first tester is adapted to make a first attempt to communicably couple to the network system under test before executing the test to obtain network security vulnerability information;

wherein said at least one first tester is adapted to make a second attempt to communicably couple to the system under test alter executing the test to obtain network security vulnerability information; and wherein the combination of success of the first attempt and failure of the second attempt are interpreted as detection of the test by the network system under test;

wherein the combination of success of the first attempt and failure of the second attempt are interpreted as detection of the test by the network system under test.

* * * * *